(12) United States Patent
Thompson

(10) Patent No.: US 7,832,330 B1
(45) Date of Patent: Nov. 16, 2010

(54) COOKER TO SMOKER ADAPTER

(76) Inventor: Donald E. Thompson, 6189 Mancuso St., San Jose, CA (US) 95120

( * ) Notice: Subject to any disclaimer, the term of this patent is extended or adjusted under 35 U.S.C. 154(b) by 1313 days.

(21) Appl. No.: 11/295,886

(22) Filed: Dec. 6, 2005

(51) Int. Cl.
*A47J 27/04* (2006.01)
*A47J 37/00* (2006.01)

(52) U.S. Cl. .............. 99/481; 99/482; 99/467; 99/446; 99/447; 99/340; 126/25 R; 126/25 B; 126/163 R; 126/79; 126/9 R

(58) Field of Classification Search .......... 99/481–2, 99/467, 446–7, 340; 126/25 R, 25 B, 215, 126/79, 9 R, 163 R
See application file for complete search history.

(56) References Cited

U.S. PATENT DOCUMENTS

| | | | |
|---|---|---|---|
| 3,088,393 | A | 5/1963 | Huckabee |
| 3,333,526 | A | 8/1967 | Kirkpatrick |
| 3,776,127 | A | 12/1973 | Muse |
| 3,786,741 | A | 1/1974 | Plumley |
| 4,020,322 | A | 4/1977 | Muse |
| 4,094,295 | A | 6/1978 | Boswell et al. |
| 4,140,049 | A | 2/1979 | Stewart |
| 4,190,677 | A | 2/1980 | Robins |
| 4,340,027 | A | 7/1982 | Fuss |
| 4,512,249 | A | 4/1985 | Mentzel |
| D283,588 | S | 4/1986 | Stuckey |
| D289,964 | S | 5/1987 | Osborne |
| 4,665,891 | A | 5/1987 | Nemec et al. |
| 4,697,506 | A | 10/1987 | Ducate, Jr. |
| 4,721,037 | A | 1/1988 | Blosnich |
| 4,770,157 | A | 9/1988 | Shepherd |
| 4,773,319 | A | 9/1988 | Holland |

(Continued)

OTHER PUBLICATIONS

"The BBQ Baffle", Craig Holdings Incorporated, *A Guide to A Perfect Barbeque Brisket, A Secret for Tender BBQ—Slow Cooking*, © 2006 Craig Holdings Inc., 8 pages, http://wwwbbqbaffle.com/TheBBQBaffle.html.

*Primary Examiner*—Shawntina Fuqua
(74) *Attorney, Agent, or Firm*—Haynes and Boone, LLP

(57) ABSTRACT

A cooker to smoker adapter is provided, and in one embodiment the cooker to smoker adapter includes first and second walls constructed to cooperate with a wall of a cooker to provide a fuel containment zone for receipt of fuel to be used in a smoking process. In another embodiment, one of the walls includes at least one aperture to readily permit the addition of fuel to the fuel containment zone. In yet another embodiment, a second aperture is provided in one of the walls, this aperture being adapted to receive a reservoir for a liquid. In a further embodiment, a liquid holding reservoir is provided integral with one of the walls. In another embodiment, stand-alone structures are provided to define a fuel containment zone to permit the burning of fuel while avoiding direct radiant transmission of heat from the fuel containment zone to a food which is being smoked. In one embodiment, the stand-alone structure is adapted to receive a reservoir for water. In a further one of the stand-alone embodiments, a cap is provided on the cooker to smoker adapter structure. In the stand-alone cooker to smoker adapters an aperture is included in the walls to permit the addition of fuel into a fuel containment zone. In the free-standing cooker to smoker adapters, a chute may also be provided to facilitate the addition of fuel into the fuel containment zone.

79 Claims, 26 Drawing Sheets

U.S. PATENT DOCUMENTS

| | | | |
|---|---|---|---|
| 4,777,927 A | 10/1988 | Stephen et al. | |
| 4,779,525 A | 10/1988 | Gaines | |
| 4,869,163 A | 9/1989 | Haskins | |
| 4,905,660 A | 3/1990 | Leduc | |
| 4,924,071 A | 5/1990 | Jacobs | |
| 5,009,151 A | 4/1991 | Hungerford | |
| 5,044,266 A | 9/1991 | Geogaris | |
| 5,048,406 A | 9/1991 | Cofer | |
| 5,070,776 A | 12/1991 | Schlosser et al. | |
| 5,070,777 A | 12/1991 | Novak | |
| 5,096,727 A | 3/1992 | Crace | |
| 5,097,817 A | 3/1992 | Dodgen | |
| 5,167,183 A | 12/1992 | Schlosser et al. | |
| 5,331,942 A | 7/1994 | McDonald et al. | |
| 5,481,965 A | 1/1996 | Kronman | |
| 5,501,142 A | 3/1996 | Bailey | |
| 5,528,984 A | 6/1996 | Saurwein | |
| 5,564,330 A | 10/1996 | Nowicke, Sr. | |
| 5,615,666 A | 4/1997 | Ransom | |
| 5,653,162 A | 8/1997 | Lunde | |
| 5,718,165 A | 2/1998 | Winstead | |
| 5,768,977 A | 6/1998 | Parris et al. | |
| 5,865,099 A | 2/1999 | Waugh | |
| 5,891,498 A | 4/1999 | Boehler | |
| 5,909,729 A * | 6/1999 | Nowicke, Jr. | 126/25 R |
| 6,019,035 A | 2/2000 | Jonas et al. | |
| 6,029,567 A | 2/2000 | Tirkkonen | |
| 6,035,770 A | 3/2000 | Whitefield | |
| 6,065,464 A | 5/2000 | Zajec | |
| 6,102,028 A | 8/2000 | Schlosser et al. | |
| 6,161,534 A | 12/2000 | Kronman | |
| 6,173,644 B1 | 1/2001 | Krall | |
| 6,209,533 B1 | 4/2001 | Ganard | |
| 6,257,130 B1 | 7/2001 | Schlosser | |
| 6,523,461 B1 | 2/2003 | Johnston et al. | |
| 6,523,463 B1 | 2/2003 | Hogle | |
| 6,688,301 B1 | 2/2004 | McNeill | |
| 6,701,829 B2 | 3/2004 | Farrow | |
| D491,410 S | 6/2004 | Saunders | |

\* cited by examiner

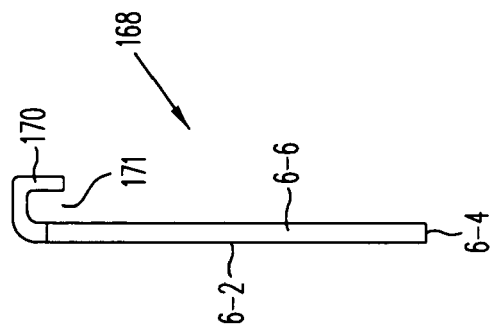
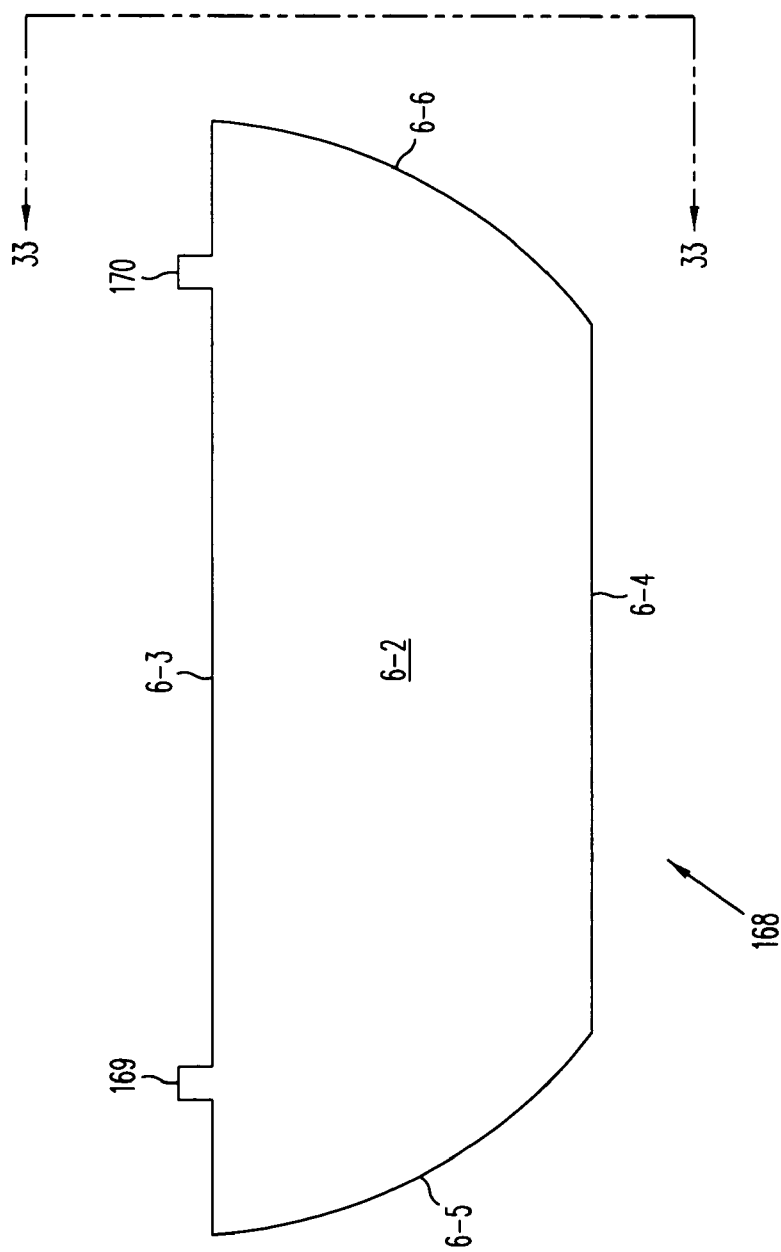

COOKER TO SMOKER ADAPTER

FIELD OF THE INVENTION

The present invention relates to food smoking apparatus and more particularly to an apparatus to convert a charcoal-fired enclosed kettle barbeque into a food smoker.

BACKGROUND OF THE INVENTION

Smoking food is a means of cooking food in which the food is kept at a temperature environment of between 200° F. and 230° F. and a means is typically provided to add moisture into the smoker structure to maintain the food in a moist condition. A number of prior art attempts have been made at producing smokers, but none have entirely met the challenges of the present invention. One prior art smoker is disclosed in U.S. Pat. No. 3,776,127 issued to Edward T. Muse on Dec. 4, 1973. Another example of a prior art structure is disclosed in U.S. Pat. No. 4,094,295 issued Jun. 13, 1978 to Boswell et al. The structure illustrated in Boswell is a vertical smoker which includes a cylinder divided into three discrete sections, a lower section containing a heat source, a middle section which includes a tray or pan of water to absorb heat and add moisture to the cooking environment and an upper section which includes food supporting grills. While smoking food in a device of this type, although satisfactory, requires the purchase of an additional item and the device of the '295 patent is rather bulky.

Another type of smoker which is known in prior art is generally referred to as a horizontally configured smoker. For example, see U.S. Pat. No. 6,209,533 issued Apr. 3, 2001 to Ganard. This configuration utilizes a separate fire box containing combustible charcoal for heating wood chips to add aromatic smoke for flavoring the material. As in the vertical smoker, a separate device is required which is bulky and expensive.

A number of structures have been proposed which are added to an existing grill, for example that category for U.S. Pat. No. 5,768,977 issued Jun. 23, 1998 to Parris et al.; U.S. Pat. No. 4,773,319 issued Sep. 27, 1988 to Holland; a design Pat. 289,964 issued May 26, 1987 to Osborne Ellwood; U.S. Pat. No. 5,718,165 issued Feb. 17, 1998 to Winstead; U.S. Pat. No. 4,140,049 issued Feb. 20, 1979 to Stewart; U.S. Pat. No. 4,190,677 issued Feb. 26, 1980 to Robins; U.S. Pat. No. 5,096,727 issued Mar. 17, 1992 to Crace; U.S. Pat. No. 5,070,777 issued Dec. 10, 1991 to Novak; U.S. Pat. No. 6,688,301 issued Feb. 10, 2004 to McNeill; U.S. Pat. No. 5,891,498 issued Apr. 6, 1999 to Boehler; U.S. Pat. No. 6,523,463 issued Feb. 25, 2003 to Hogle; U.S. Pat. No. 6,065,464 issued May 23, 2002 to Cajec; and U.S. Pat. No. 4,777,927 issued Oct. 18, 1998 to Stephen et al.

Some of the foregoing prior art devices have included an arrangement for dividing heat sources and in some instances also to provide moisture into the cooking environment. However, none of the foregoing devices are entirely satisfactory for use as smokers. What is needed is a simple and inexpensive structure for converting an existing cooking structure into a satisfactory smoker. None of the foregoing devices have achieved this goal.

SUMMARY OF THE INVENTION

In accordance with one embodiment of the present invention, a heat directing structure is provided which cooperates with a cooker of a well-known type. In this heat directing structure a first and a second wall cooperate with the existing cooking structure to provide a separation of a heat source from the food being smoked. With the first and second walls cooperating with the existing cooking structure, direct heat radiation from the heat source to the food being smoked is avoided. In a further embodiment, one of the walls includes an aperture for supporting a container for holding liquid. In the further embodiment, one of the walls includes at least one aperture which allows the user to add additional charcoal or other fuel source of heat being produced by a fire. In a further embodiment, one of the walls includes a second wall of material spaced apart from the wall to further reduce the heat being transmitted to the food.

In a further embodiment of the present invention, a structure for utilization with an existing cooking structure is provided. In this embodiment, a structure is provided which is supported on a grill within the cooking structure and the smoker structure includes a wall of material which provides an enclosure to surround a source of heat. In one embodiment, the smoker structure wall is configured to provide a cylindrically-shaped structure. In a further embodiment, the wall is configured to provide a conical-shaped structure. In these embodiments, a fuel source is placed on a fuel source supporting grill, ignited and then the smoker structure is placed over the burning fuel. To provide for convenient addition of additional fuel, the smoker structure may include an aperture in the sidewall and a chute are supported adjacent to the aperture to provide for the convenient addition of fuel.

In the further embodiment, the smoker structure may include a container which is integral with one of the walls, the container being adapted to hold water. This structure provides additional separation of heat from the fire box to the food being smoked and also provides an integral container for holding water to add moisture to the cooking environment. In this embodiment, one more apertures are provided in a horizontal wall to readily permit the addition of fuel into the fire box area.

In another embodiment of the present invention, first and second walls are provided to isolate the heat source and prevent direct radiation of heat from the source to the food being smoked. In this embodiment, the walls are in separate pieces which cooperate with the sidewall of an existing cooking structure. In this embodiment, an upper one of the walls may include one or more apertures for allowing the addition of fuel. Additionally, one of the walls includes an aperture to support a container for liquid.

This invention will be more fully understood in conjunction with the formal drawings and following detailed description.

DESCRIPTION OF THE DRAWINGS

FIG. 2 is a top view of the embodiment of the present invention as disclosed in

FIG. 1;

FIG. 32 is a plan view of another embodiment of the present invention; and

FIG. 33 is a view taken along line 33-33 in FIG. 32.

DETAILED DESCRIPTION

The following description is meant to be illustrative only and not limiting. Other embodiments of this invention will be obvious from this description to those skilled in the art.

Figure 1:
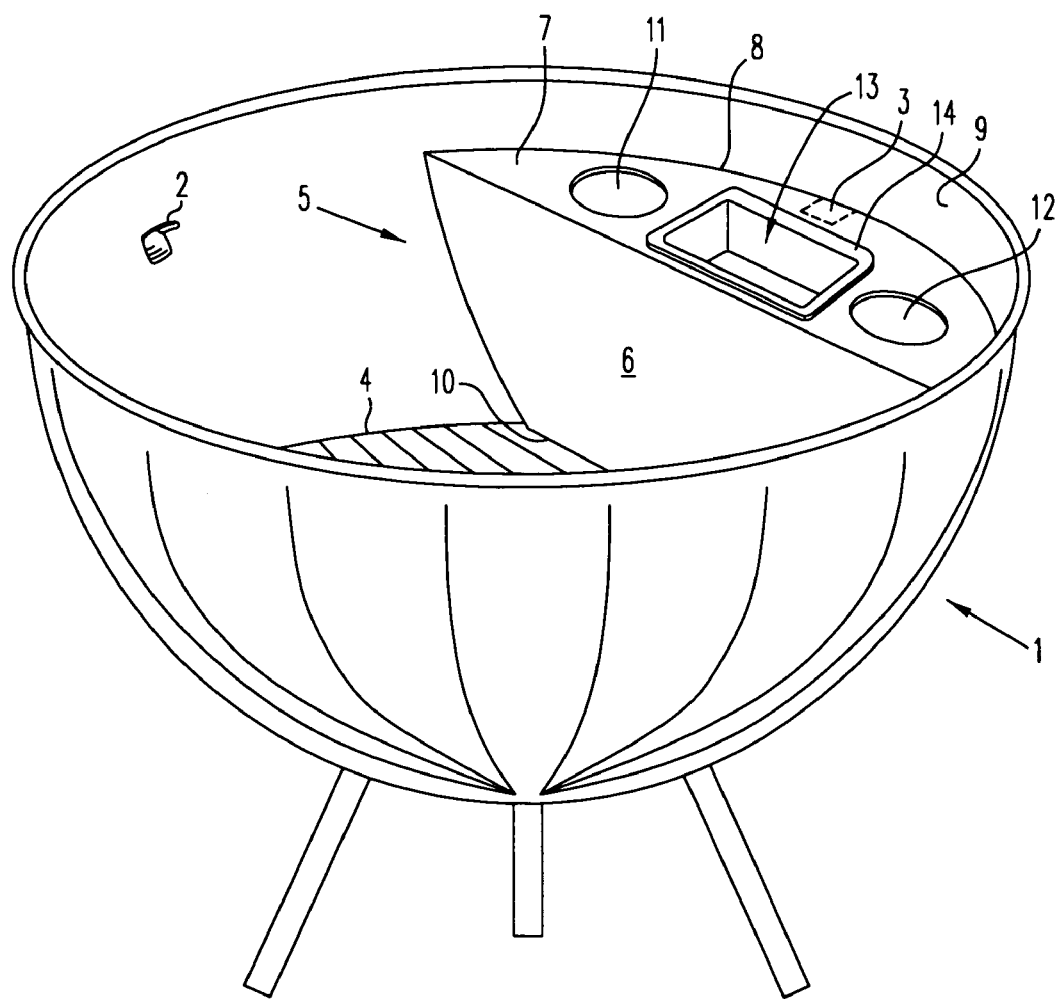
FIG. 1 is a perspective view of one embodiment of the present invention as utilized inside of a hemispherically shaped cooker.

The present invention is illustrated in connection with the conversion of a cooker to a smoker and in the illustrated embodiments a hemispherically shaped cooker structure is illustrated. However, the present invention is, as will be appreciated by reference to the figures and explanation, also be applicable to converting cookers having various geometrical structures. For example, the present invention may be utilized with cookers having a rectangular wall configuration or any other wall configuration. Turning to FIG. 1, the first embodiment of the present invention is illustrated in connection with the cooker 1 which is of a hemispherical shaped and will be recognized, for example as a Weber type grill. As shown in FIG. 1 for ease of illustration the cover of cooker 1 has not been shown. Additionally, for ease of illustration the cooking grill which supports the food to be cooked and which is supported on tabs indicated at reference characters 2 and 3 has also not been shown to allow better illustration of the present invention. As is well known, a grill indicated by reference character 4 is used to support fuel, which is typically charcoal, for use in providing a source of heat to cook food in cooker 1. Cooker to smoker adapter indicated by reference character 5 is provided to enclose fuel, not shown, behind the structure to avoid the direct radiant heating of food to be placed in the smoker. In the bottom illustrated in FIG. 1, cooker to smoker adapter 5 is constructed utilizing a single piece of metal sheet having a first vertical section indicated by reference character 6 and a second bent-over portion indicated by reference character 7. It will be appreciated by reference to FIG. 1 that the edge 8 of horizontal section 7 has been shaped to conform to the inner wall 9 of cooker 1. Also it will be appreciated by reference to FIG. 1 that the cooker to smoker adapter 5 is supported by the tab 3 on the outer wall and that the lower edge 10 of vertical portion 6 is supported by the fuel support grill indicated by reference character 4. Cooker to smoker adapter 5 may be constructed using metal such as #1 carbon steel, stainless steel or porcelain coated carbon steel or stainless steel, and having a thickness of about 0.045". An alternative material for utilization in cooker to smoker adapter 5 is enamel coated steel. It will of course be appreciated that other material having suitable characteristics to withstand the temperatures which will be encountered. Wall 7 includes apertures 11 and 12 which permit the addition of fuel and wood chips for smoke production to the area enclosed by the cooker to smoker adapter easily and without necessity of moving the cooker to smoker adapter in order to add additional fuel. As is well known by those skilled in the art, part of the smoking process involves the addition of moisture into the smoking environment and in the cooker to smoker adapter 5 this is achieved by the inclusion of a reservoir shown and indicated by reference character 13. Reservoir 13 is supported on wall portion 7 by a rim 14 of the reservoir which extends around the rectangular opening (not shown) in wall 7. Although reservoir 13 is in the present illustration rectangular shaped, it will be appreciated that any shape may be utilized.

Figure 2:
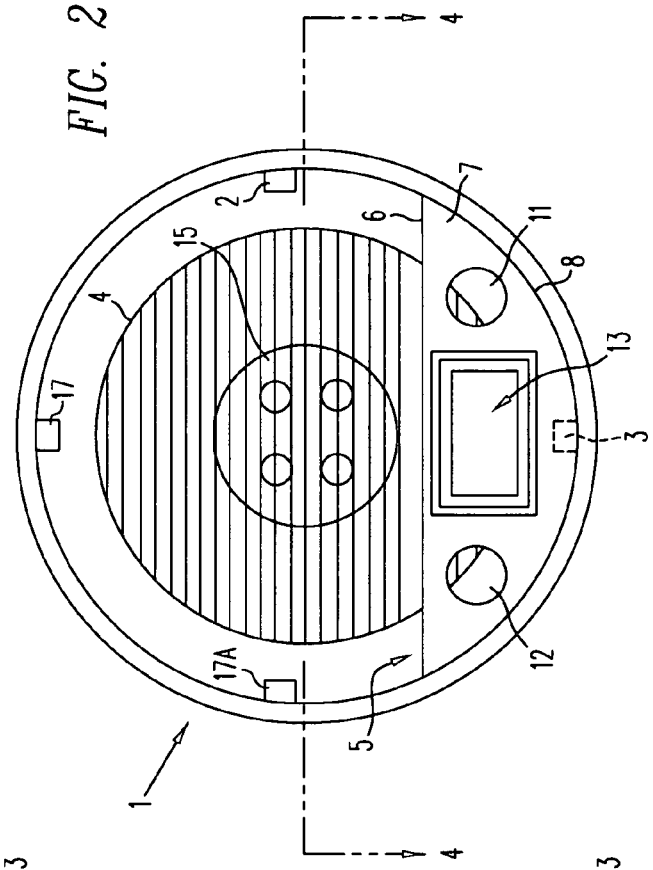

Referring to FIG. 2, a top plan view of the cooker 1 with a cooker to smoker adapter 5 is illustrated. In FIG. 2 there is also illustrated air damper 15 which is used to determine the amount of air which is allowed to enter cooker 1. As it will be appreciated by reference to FIG. 2, apertures 11 and 12 are cylindrically shaped, however other shapes may be utilized. Also as shown in FIG. 2, tab 3 conveniently supports cooker to smoker adapter 5 at the outer peripheral edge 8. In the present embodiment, the cooker to smoker adapter 5 is supported by using existing tabs which are normally included for supporting the food supporting grill of the cooker as originally constructed, however it will of course be appreciated that an additional tab may be utilized so that the height of wall 6 is less than that necessary to support wall 7 by a food supporting tab such as 3. However, by utilizing existing structures in the cooker the conversion of a cooker to a smoker is conveniently achieved without additional structure added to the cooker as it is generally distributed.

Figure 3:
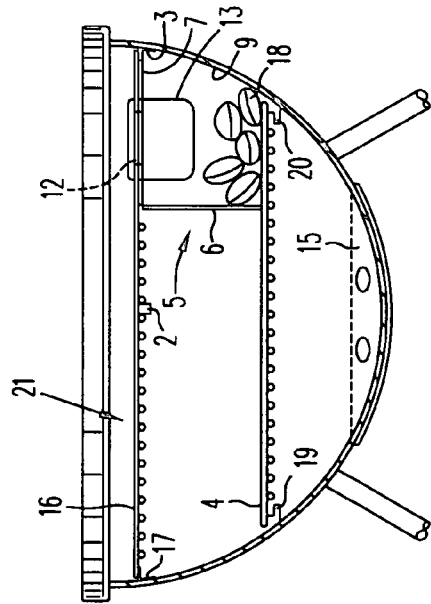
FIG. 3 is a sectional view taken along the lines 3-3 of FIG. 2.

Referring to FIG. 3, which is a cross sectional view taken along the lines 3-3 of FIG. 2, a side view of the cooker to smoker adapter 5 is illustrated, and also included and this figure for illustrative purposes is food supporting grill 16 which is supported by tabs 2, 3 and 17, and as will be appreciated by a reference to FIG. 3 the food supporting grill is positioned immediately above wall 7 of the cooker to smoker adapter 5. Also illustrated in FIG. 3 is a fuel source, which may be for example charcoal, indicated by reference character 18. As will be appreciated by reference to FIG. 3, the fuel source is bounded by walls 6 and 7 of the cooker to smoker adapter and wall 9 of cooker 1. This of course prevents direct radiant heating of a food to be smoked, which would be placed on food support grill in region 21, and thus facilitating the well-known smoking process. As pointed out above, as the fuel source is depleted, additional fuel may be conveniently added by dropping it through apertures 11 and 12. Similarly, the reservoir 13 may be conveniently refilled by water to permit the continuous and uninterrupted smoking process achievable through use of the present invention. As shown in FIG. 3, fuel supporting grill 4 is supported by tabs 19 and 20.

Figure 4:
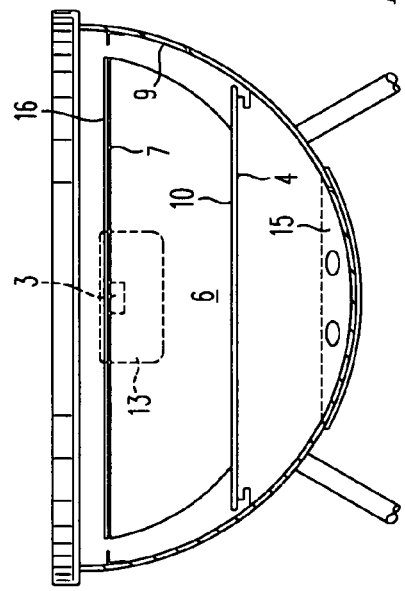
FIG. 4 is a sectional view taken along the lines 4-4 of FIG. 2.

Next, turning to FIG. 4, which is a view taken along lines 4-4 of FIG. 2, it will be appreciated that the lower edge 10 of vertical wall 6 is supported on fuel supporting grill 4 and, as pointed out above, wall 7 is supported by tab 3. Also as will be noted in FIG. 4, food supporting grill 16 is positioned immediately above wall 7 of cooker to smoker adapter 5.

As pointed out above, cooker to smoker adapter 5 illustrated in FIGS. 1-4 may be conveniently constructed utilizing a unitary metal plate, however, a functionally similar structure may be produced utilizing a plurality of plates, for example, as illustrated in the embodiment shown and hereinafter later described in connection with the embodiment illustrated in FIGS. 24, 25 and 26.

Figure 1A:
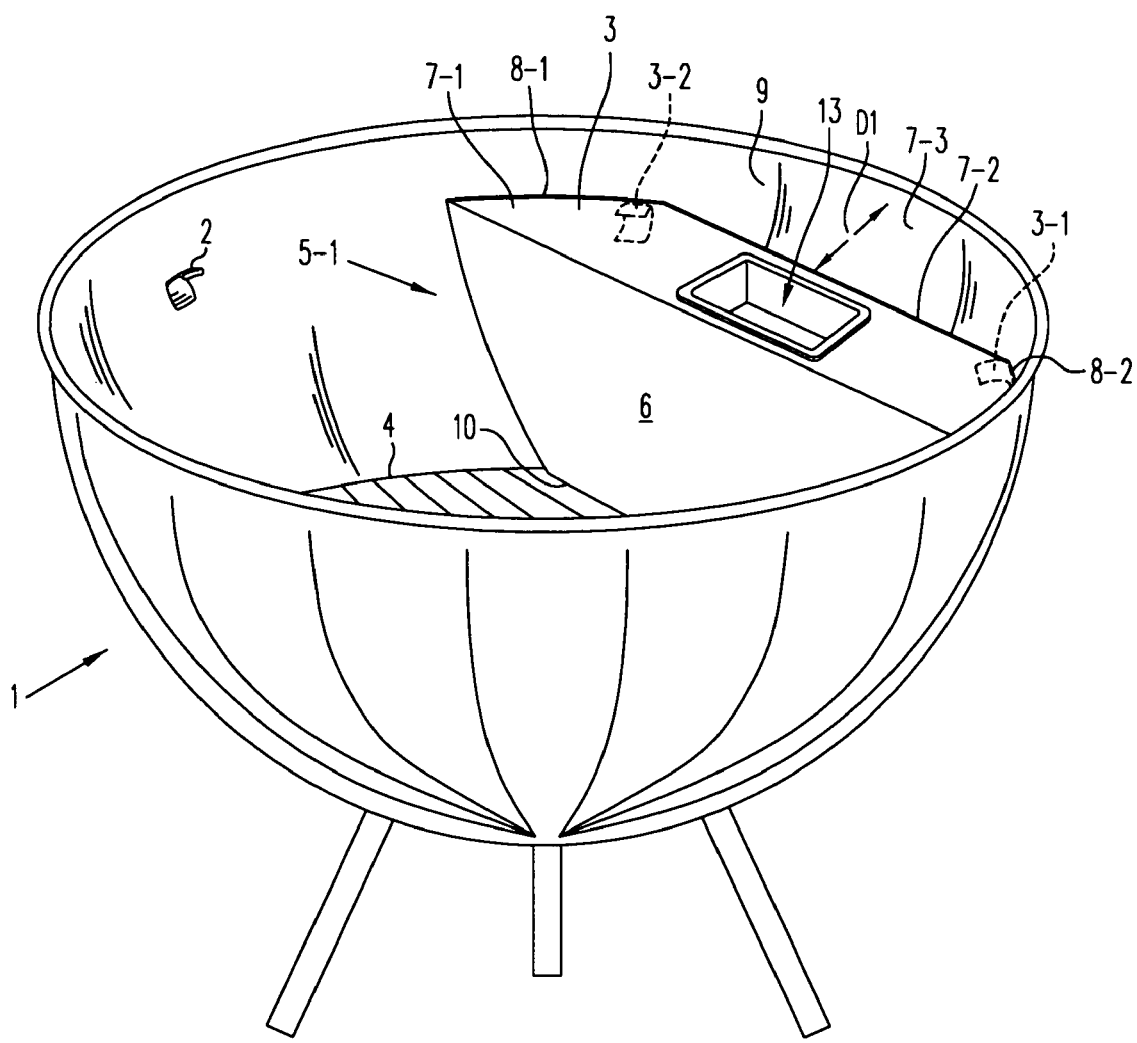
FIG. 1A is a perspective view of an embodiment of the present invention, the embodiment sharing some of the features found in the embodiment shown in FIG. 1.

FIG. 1A is a perspective view of an alternative embodiment of the present invention. In FIG. 1A, cooker to smoker adapter 5-1 is shown in an operative position within cooker 1. In some respects, cooker to smoker adapter 5-1 includes features similar to those of to cooker to smoker adapter 5 shown in FIG. 1, however certain modifications will be appreciated by reference to the figure. More particularly, wall 7-1 which extends from the first vertical wall 6 does not include apertures to permit the addition of fuel into the fuel containment area behind wall 6. In the embodiment of FIG. 1A, the addition of fuel may be easily achieved by depositing it between end wall 7-2 of wall 7-1 in the inner wall portion of cooker 1, the inner wall portion being denoted by reference character 7-3. By referring to FIG. 1A, it will be noted that end wall 7-2 is spaced apart from inner wall 7-3 by distance indicated by reference character D1. As will be appreciated by reference to FIG. 1, in the cooker to smoker adapter 5 shown in FIG. 1 wall 7 extends outwardly to inner wall 9 and approaching inner wall 9 in close proximity to the curvature of the wall. However, a close fitting relationship between edge of wall 7 in the inner wall 9 is optional, and as will be appreciated in later embodiments, not all of the upper wall of the cooker to smoker adapter necessarily adjoins closely with the inner wall 9.

In the embodiment shown in FIG. 1A, tabs 3-1 and 3-2 are positioned extending from inner wall 9 to support wall 7-1. As in the embodiment in FIG. 1, edge 10 of wall 6 rests on fuel support grill 4. In a fashion similar to the embodiment shown in FIG. 1, edge wall 8-1 of cooker to smoker adapter 5-1 extends outwardly and is positioned adjacent to inner wall 9. However, spacing may be utilized at that location. Of course, the opposite side of upper wall 7-1, the opposite side being indicated by reference character 8-2 extends to the adjacent portion of inner wall 9.

Figure 5:
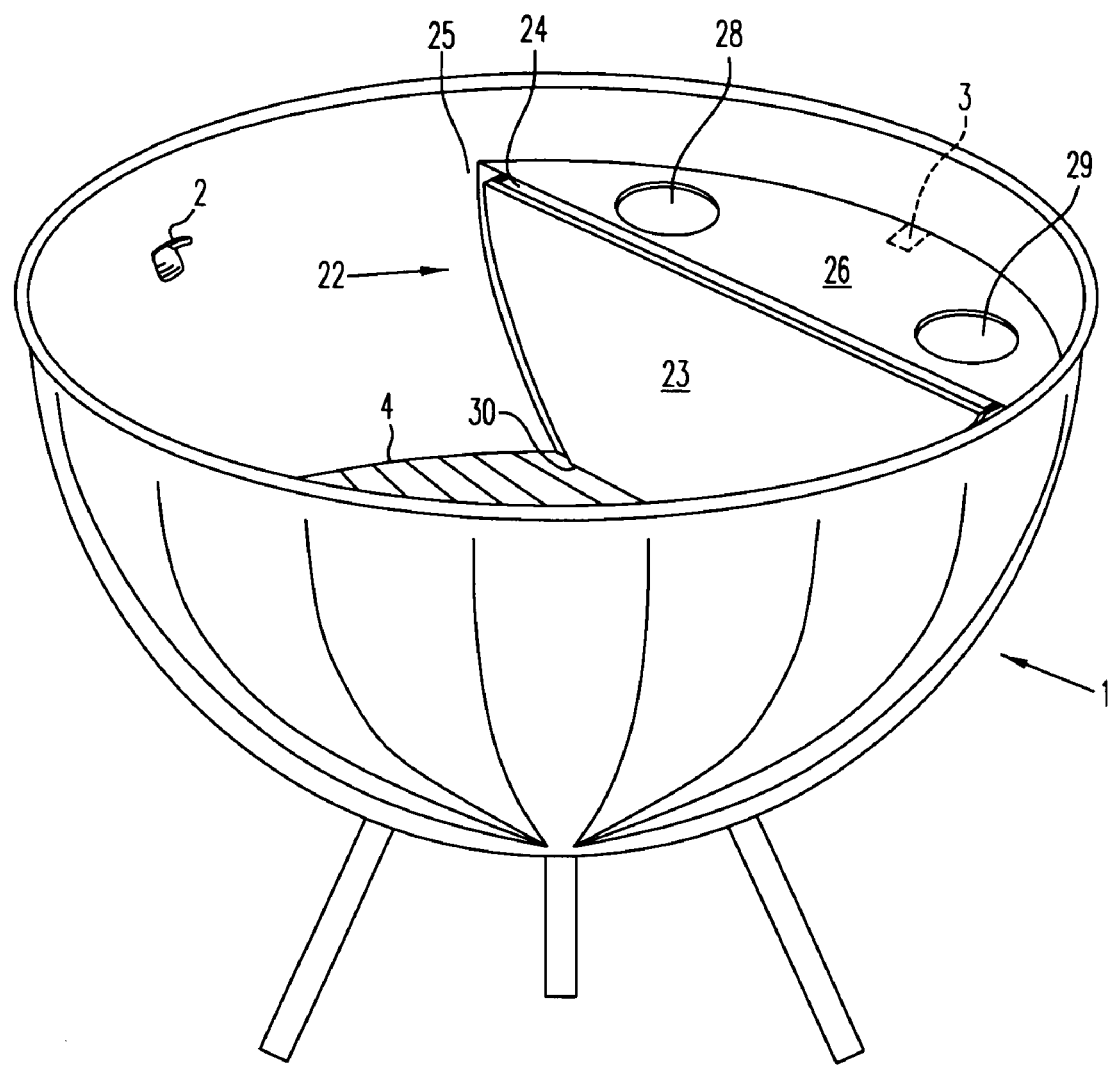
FIG. 5 is a perspective view of a second embodiment of the present invention adapted for use in conjunction with a hemispherical-shaped cooker.

Turning to FIGS. 5-8, the second embodiment of a cooker smoker adapter is shown. Turning in particular to FIG. 5, in cooker to smoker adapter 22 a pair of vertical walls 23 and 24 which are connected at their outer periphery, except along the top, provide a cavity 25 for receiving water to be utilized in the smoking process. In this embodiment, wall 26 is supported by tab 3 and wall 24 is supported on fuel support grill 4. This will be further appreciated by reference also to FIGS. 7 and 8.

Figure 6:
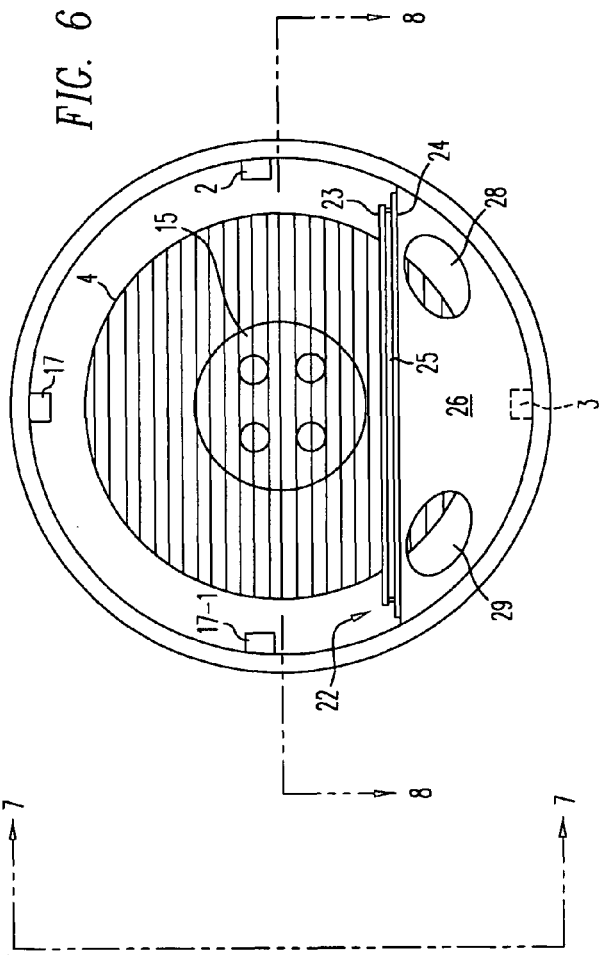
FIG. 6 is a top plane view of the embodiment illustrated in FIG. 5.

For convenience of adding fuel into the cavity 27 (FIG. 7) which is defined by outer wall of cooker to smoker adapter 22 and the inner wall 9 of cooker 1, apertures 28 and 29 are provided in wall 26. Although as illustrated in FIGS. 5 and 6, apertures 28 and 29 are oval in shape, other shapes may be utilized and of course a different number of apertures may be utilized as desired by the person constructing the adapter.

Figure 7:
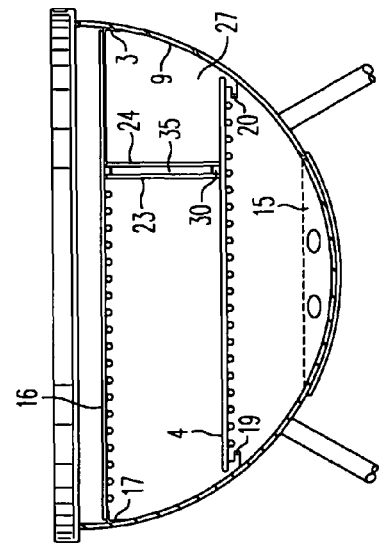
FIG. 7 is a sectional view taken along the lines 7-7 of FIG. 6.

As will be appreciated by reference to FIG. 7, wall 35 extends from wall 24, except across the top of wall 23, to the surface of wall 24 to form cavity 25. Wall 35 may be secured to the adjacent surface of wall 24 by a continuous weld.

In this embodiment it will be noted that the cooker to smoker adapter 22, in a fashion similar to that cooker to smoker adapter 5, encompasses the area which has an upper wall 26 immediately beneath food supporting grill 16. As pointed out above, it is not necessary of course that the wall 26 necessarily be immediately beneath the food supporting grill 16, and a lesser height of the vertical wall 23 and 24 may be utilized to reduce the size of the cavity 27, but yet achieve the advantages of the present invention.

Figure 8:
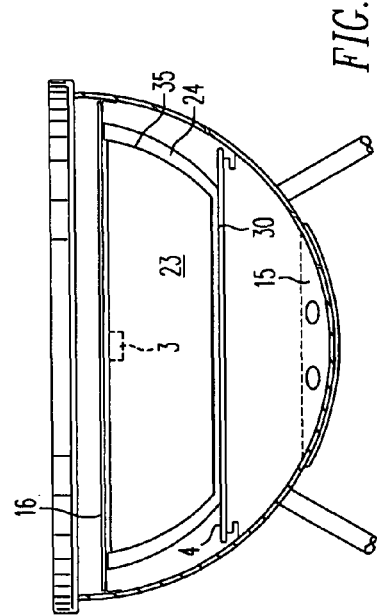
FIG. 8 is a view taken along the lines 8-8 of FIG. 6.

Turning to FIG. 8, it will be appreciated that the lower edge 30 of wall 24 is supported on fuel supporting grill 4.

Cooker to smoker adapter 22 may be constructed utilizing materials the same as or similar to those described above in connection with the construction of cooker to smoker adapter 5. As illustrated in FIGS. 3 and 7 for example, tabs 19 and 20 support fuel support grill 4. Also, as illustrated in the prior figures, food support grill 16 is supported by tabs 2, 3, 17 and 17-1.

Figure 9:
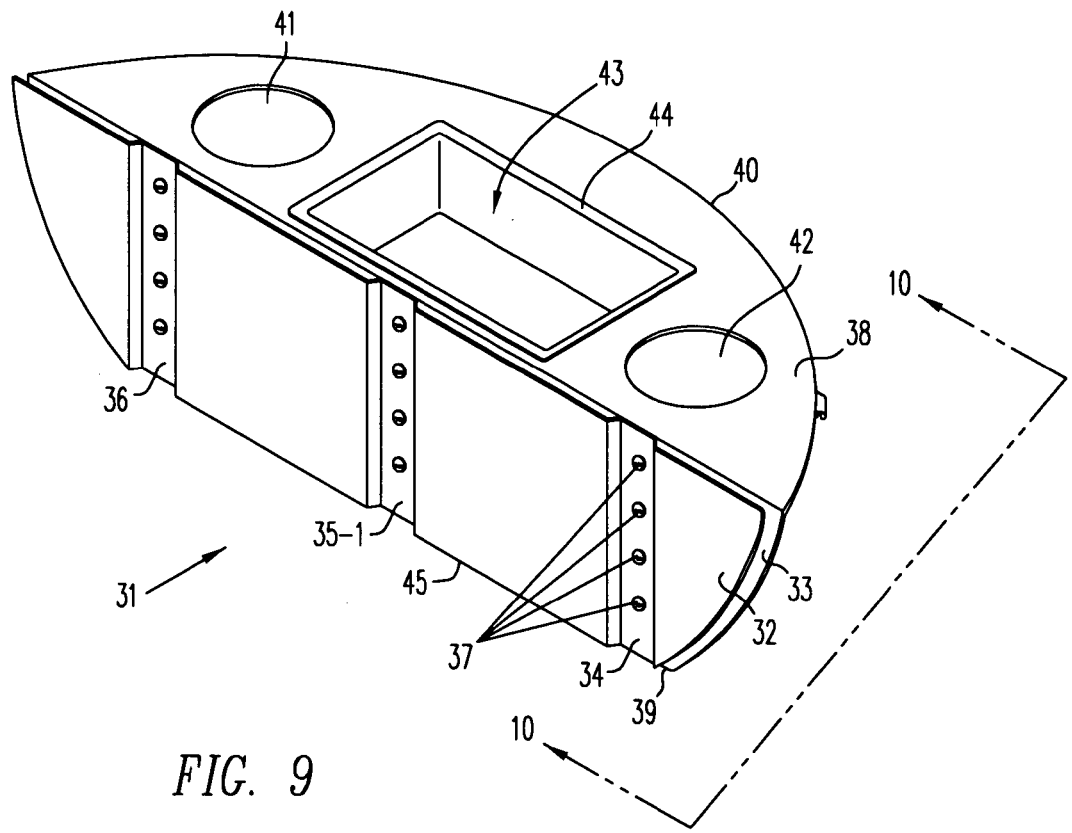
FIG. 9 illustrates a third embodiment of a cooker to smoker adapter according to the present invention.

Referring to FIG. 9, a third embodiment of the present invention is illustrated. Cooker to smoker adapter 31 is shown in FIG. 9 in a perspective view. As will be appreciated by reference to FIG. 1, cooker to smoker adapter 31 is similar in many respects to cooker to smoker adapter 5 illustrated in FIG. 1. However, in cooker to smoker adapter 31 a wall 32 is added in front of wall 33 to provide additional shielding of radiant heat from the heat source, not shown, which would be of the type similar to that illustrated in FIG. 3 for example. Although various techniques may be utilized to attach wall 32 to wall 33, a convenient way to do is to recessed sections 34, 35-1 and 36 which are bent as illustrated in FIG. 9 to permit the attachment of wall 32 to wall 33 by the use of suitable attachment means, which may be, for example, rivets indicated by reference character 37. Alternatively, wall 32 may be spot welded to wall 33. In the embodiment illustrated in FIG. 9, wall 38 is an extension of and unitary with wall 33 and thus this structure may be constructed by appropriately bending a sheet of material, which may be for example, of the type described above with regard to cooker to smoker adapter 5. In the fashion similar to that illustrated in the previous embodiments, the lower edge 39 of wall 33 would be supported on the fuel support grill 4, and the outer peripheral edge 40 of wall 38 would be supported by tab 3 shown in FIG. 1 on the inner wall of the grill. As illustrated in FIG. 9, outer peripheral edge 40 of wall 38 is semi-circular but of course this is to match in the curvature of the associated wall of the cooker. Since the invention may be practiced utilizing cookers of various construction, the peripheral geometry of wall 40 may, for example, be a rectangular to match an associated rectangular shaped portion of a cooker.

Figure 10:
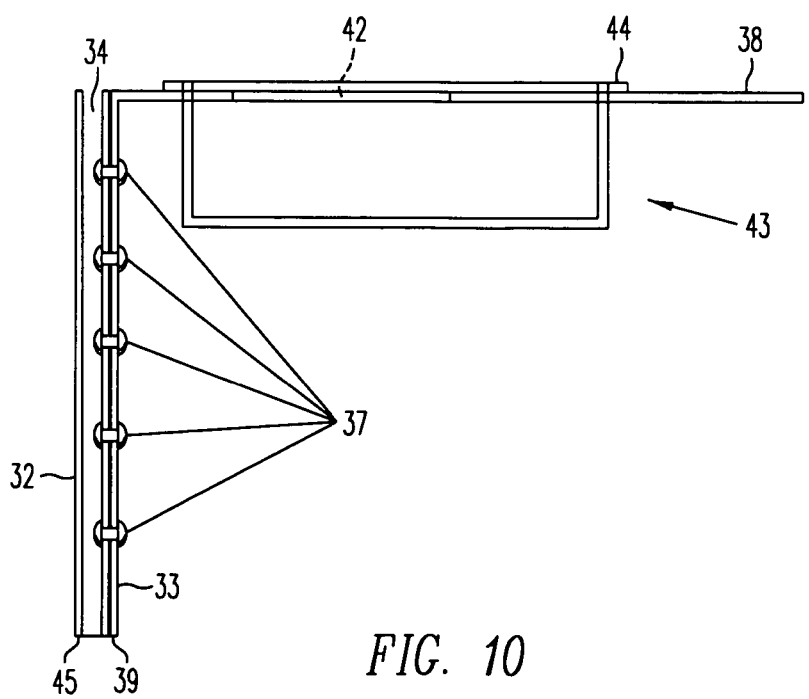
FIG. 10 is a side view taken along the lines 10-10 in FIG. 9.

In a fashion similar to those cooker to smoker adapters of the previously described embodiments, apertures 41 and 42 are provided in the wall 38 to facilitate the easy addition of fuel and smoke producing wood chips or chunks into the cavity formed when the cooker to smoker adapter 31 is associated with a cooker. Also in similar fashion, a reservoir 43 may be supported in an aperture (not shown) in wall 38. As illustrated in FIG. 10, reservoir 43 extends downwardly from a wall 38 and is supported by rim 44. As will be appreciated by reference to FIG. 10, the lower edge 45 of wall 32 extends downwardly to the same extent that lower edge 39 of wall 33 extends. However, it is of course not necessary that they both extend that to the same amount and the length of wall 32 is discretionary with the builder.

Figure 11:
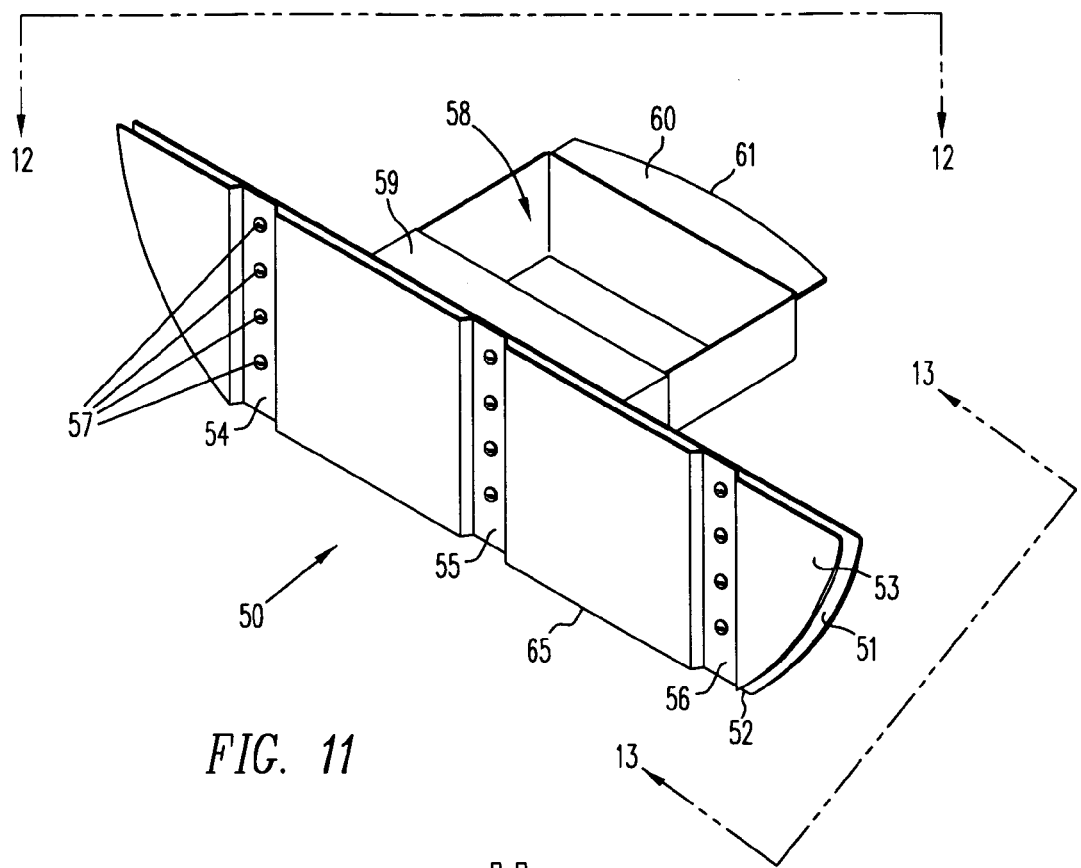
FIG. 11 shows a fourth embodiment of the present invention in perspective view.
Figure 12:
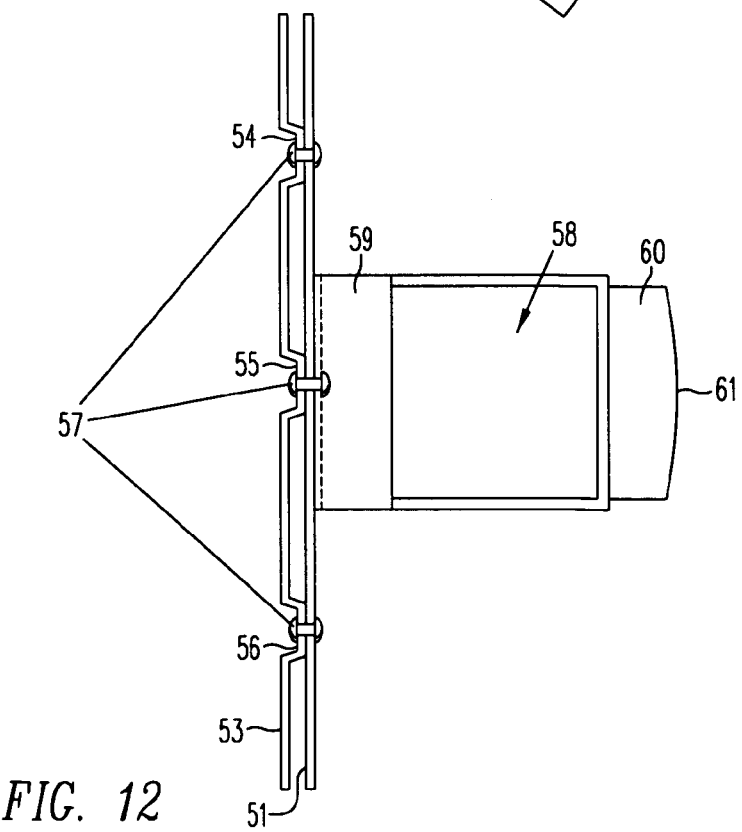
FIG. 12 is a view taken along the lines 12-12 of FIG. 11.
Figure 13:
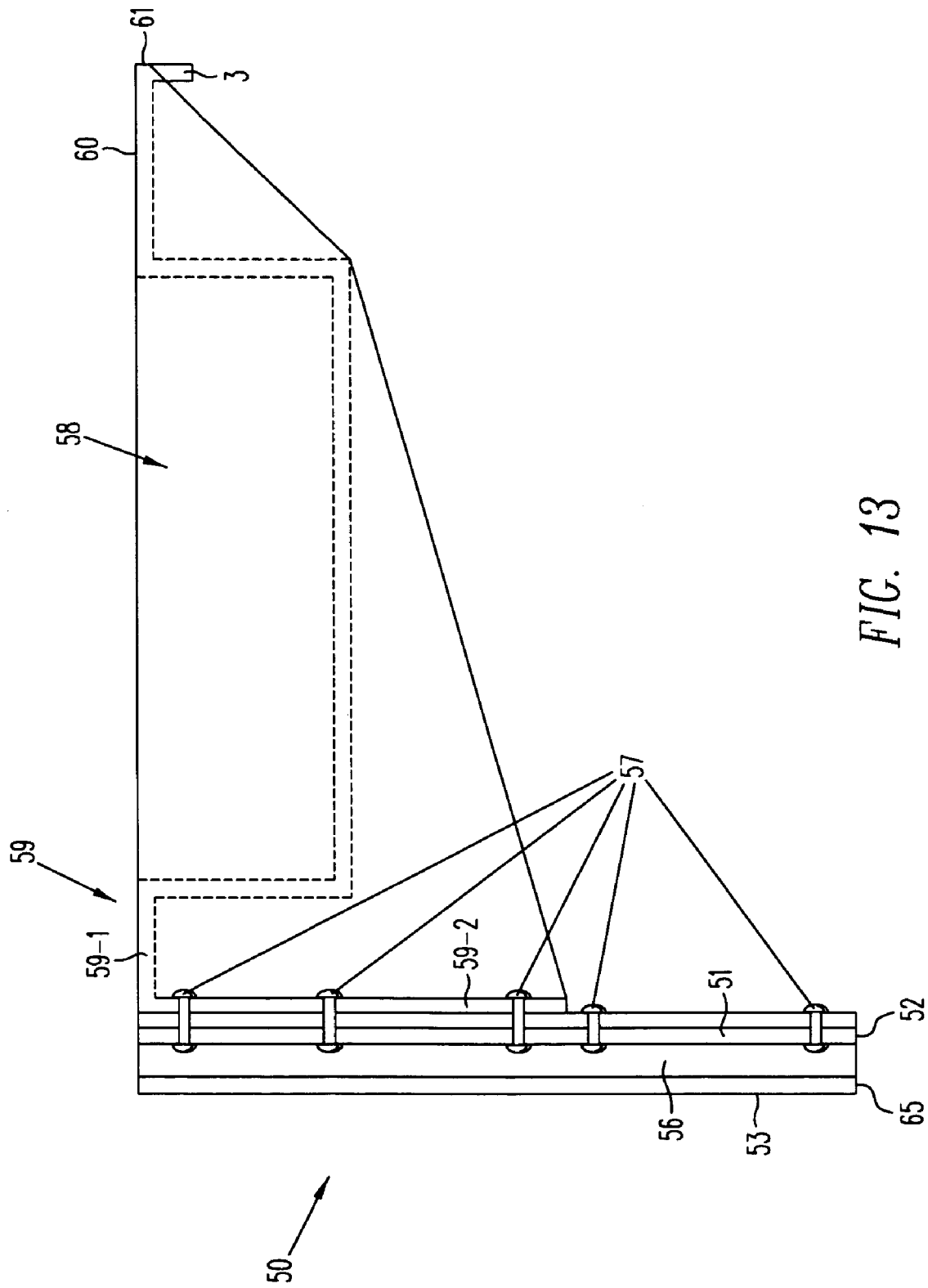
FIG. 13 is a view taken along the lines 13-13 in FIG. 11.

FIGS. 11-13 illustrate the fourth embodiment of the present invention. From reference to these figures it will be appreciated that cooker to smoker adapter 50 is in many respects constructed similarly to above-described embodiments, for example in that cooker to smoker adapter 50 is constructed to be supported on fuel support grill 4 of a cooker of the type illustrated in figures previously above described. Referring to FIG. 11, cooker to smoker adapter 50 includes wall 51 which extends, as illustrated in FIG. 11 vertically and includes lower edge 52 constructed for being supported on the fuel support grill 4. In fashion similar to that illustrated in the embodiment of FIG. 9, a second wall 53 is attached to wall 51 to provide additional isolation between a fuel source and food to be supported on food supporting grill 16 in a smoking process. Wall 53 may be supported to and connected to wall 51 in the manner illustrated and described above in connection with the cooker to smoker adapter 31 in FIG. 9. The use of wall 53 is optional and is not required in practicing the present invention to achieve the cooker to smoker adapter 50. The materials, thickness and construction thereof of walls 51 and 53 may be of the specifications provided in respect to the foregoing embodiments. As illustrated in the previous embodiment, recessed sections 54, 55 and 56 of the wall 53 are bent such that they conveniently can be attached to the adjacent surface of wall 51 utilizing rivets or similar attachment means indicated by reference character 57.

As in previous embodiments, a reservoir 58 is provided to receive water to be utilized in the smoking process. As will be appreciated in a review of FIGS. 11, 12 and 13, reservoir 58 is constructed integrally with wall 59 which extends, as illustrated in FIG. 11, horizontally toward the inner surface of wall 51 and is connected to a wall 51 using rivets indicated by reference characters 57. Additionally, as will be appreciated by reference to FIGS. 11, 12 and 13, an extension of this integral assembly includes a portion 60 which extends in the direction away from wall 51. Portion 60, permits the structure to be supported on tab 3 as illustrated in the previous figures. Outer edge 61 of portion 60 is curvilinear to match that of the inner wall of the cooker to which it is associated. As pointed out above, in this embodiment the grill is a hemispherically shaped unit and accordingly the outer edge 61 is geometrically constructed as indicated in the figures. As will be appreciated by reference to FIG. 13, lower edge 65 of wall 53 extends to the same length as lower edge 52 of wall 51. This of course is optional and wall 53 does not need to be the same height as wall 51. Also, for this embodiment the utilization of wall 53 is optional and merely provides additional reduction of heat from the fuel source, not shown, toward the food being smoked, the food being supported on food support grill 16 as illustrated in FIG. 3, for example.

In this embodiment, the fuel and smoke producing material to be provided to burn and provide a source of heat may be easily deposited on opposite sides of reservoir 58 and support structure 59 and 60. As will be appreciated by reference to the FIG. 13, a support wall 59 includes one portion which extends from walls 51 and 53 at right angles, and a second portion 59-2 which extends in a parallel fashion to walls 51 and 53 and permit the attachment of the integral wall 59, reservoir 58 and portion 60 of the wall 59.

In the previously-described embodiments, the cooker to smoker adapter utilized a wall of a cooker to create a zone for receiving fuel. The cooker to smoker adapter and the wall of the cooker create an environment which essentially eliminates the direct radiation of heat to foodstuff to achieve smoking rather than a cooking of the food. In contrast to the embodiments previously described, the embodiments illustrated in FIGS. 14-23 provide cooker to smoker adapters which do not rely on a wall of a cooker to provide the zone in which fuel is placed in the cooker to smoker adapter. The embodiments in FIGS. 14-23 provide the necessary environment within a cooking structure to achieve exemplary smoking of food. Also, in the embodiments illustrated in FIGS. 14-23 the associated cooking structure is not shown, however, the cooker to smoker adapter illustrated in these figures would be placed on a fuel support grill, for example, as illustrated in FIG. 1 which is indicated by reference character 4. With these embodiments, it is of course not necessary to utilize the cooker to adapter structure which cooperates with a wall of the grill but rather the embodiments are free-standing and do not require the cooperative structure of the cooking grill. In some of FIGS. 14-23 charcoal is indicated as a heat source and in those figures it is assumed that the charcoal is supported on a fuel support grill which is not shown.

Figure 14:
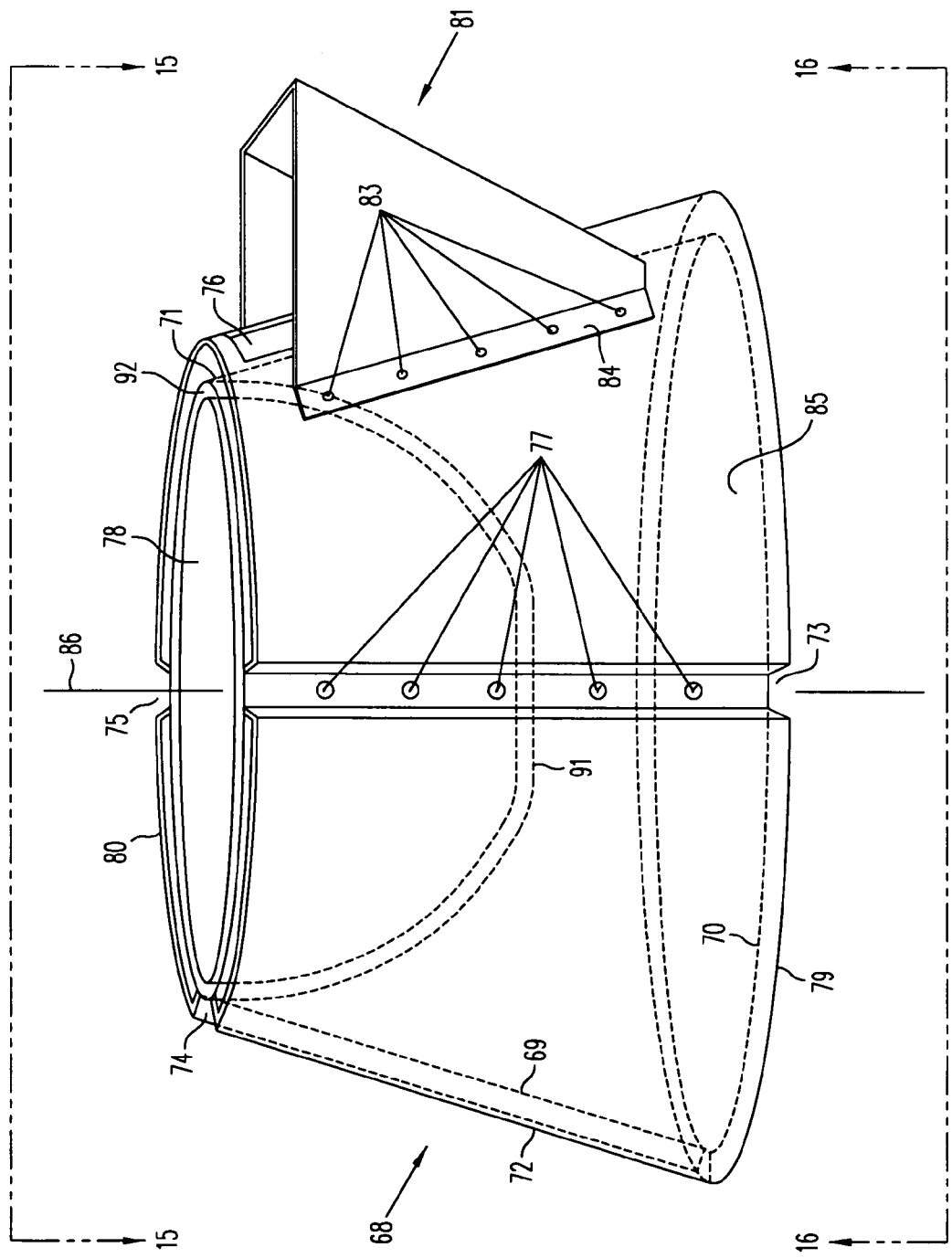
FIG. 14 is a perspective view of a fifth embodiment of the cooker to smoker adapter according to the present invention.

Turning to FIG. 14, a cooker to smoker adapter 68 is illustrated in perspective view. In this embodiment, the structure is provided with dual walls which are interconnected as will be described below to provide a truncated conical structure. Referring to FIG. 14, cooker to smoker adapter 68 includes an inner wall 69 which extends from a lower edge 70 vertically upward and terminates in an upper edge 71. As will be appreciated by reference to FIG. 14, wall 69 extends about axis 86 and provides zone 85 for the containment of fuel (not shown). Inner wall 69 may be constructed from a material such as sheet metal made of carbon or stainless steel having a thickness of about 0.036", and of course may be made of whatever height is appropriate for the cooker in which the cooker to smoker adapter is being utilized. As an optional, however and desirable feature, a second wall 72 is attached to wall 69 at a plurality of junctions for example as those indicated at 73, 74, 75 and 76. Junctions 73-76 are formed by bending wall 72 inwardly to form U-shaped channels. As will be appreciated by reference to FIG. 14, wall 72 is spaced apart from wall 69 and provides an air gap between the two walls except at junctions 73, 74, 75 and 76 where outer wall 72 is attached to inner wall 69, for example, by rivets indicated by reference character 77. Although not shown in the figures, rivets are also provided at each of the locations 74, 75 and 76 to secure the outer wall 72 to the inner wall 69. Wall 72 may be constructed of the same material to have the same thickness as wall 69, however the construction of the cooker to smoker adapter 68 does not require that these walls necessarily be the same thickness nor of the same material. In the embodiment illustrated in FIG. 14, a bowl 78 extends within the inner wall 69 and provides the function of receiving water to be used in the smoking process. Wall 72 terminates at lower edge 79, and terminates at the upper end at edge 80. To facilitate the addition of additional fuel to the structure, a chute 81 is attached to outer wall 72. The lower edge of chute 81 terminates in a position resting against outer wall 72 just below a lower edge of aperture 82 which extends through both outer wall 72 and inner wall 69. This conveniently permits the addition of fuel without having to move the cooker to smoker adapter 68 to insert fuel and material for producing smoke. Chute 81 may be attached to outer wall 72 utilizing suitable attachment structures, for example rivets 83 which secure peripheral edge 84 of chute 81 to wall 72.

Figure 15:
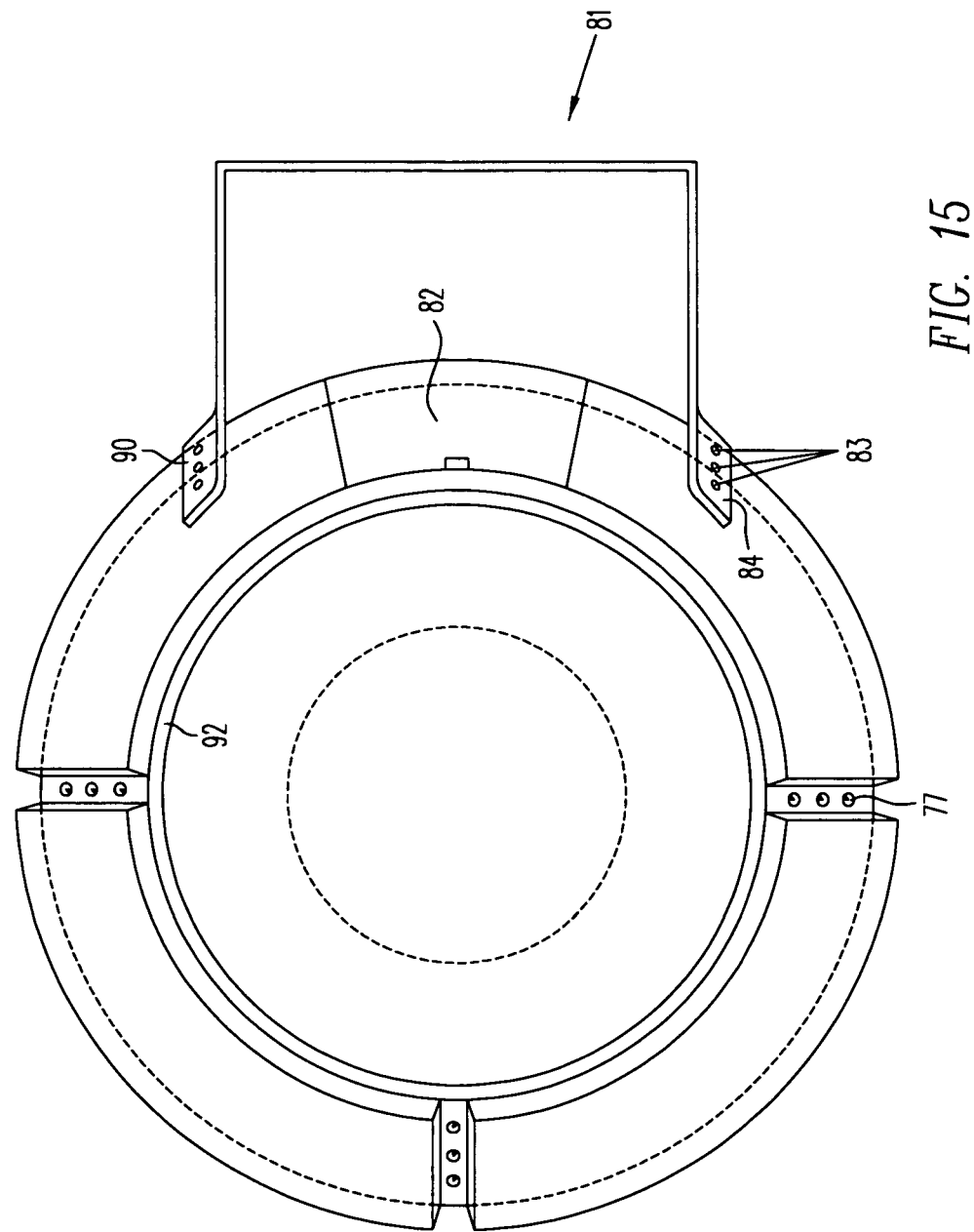
FIG. 15 is a top view taken along the lines 15-15 of FIG. 14.
Figure 16:
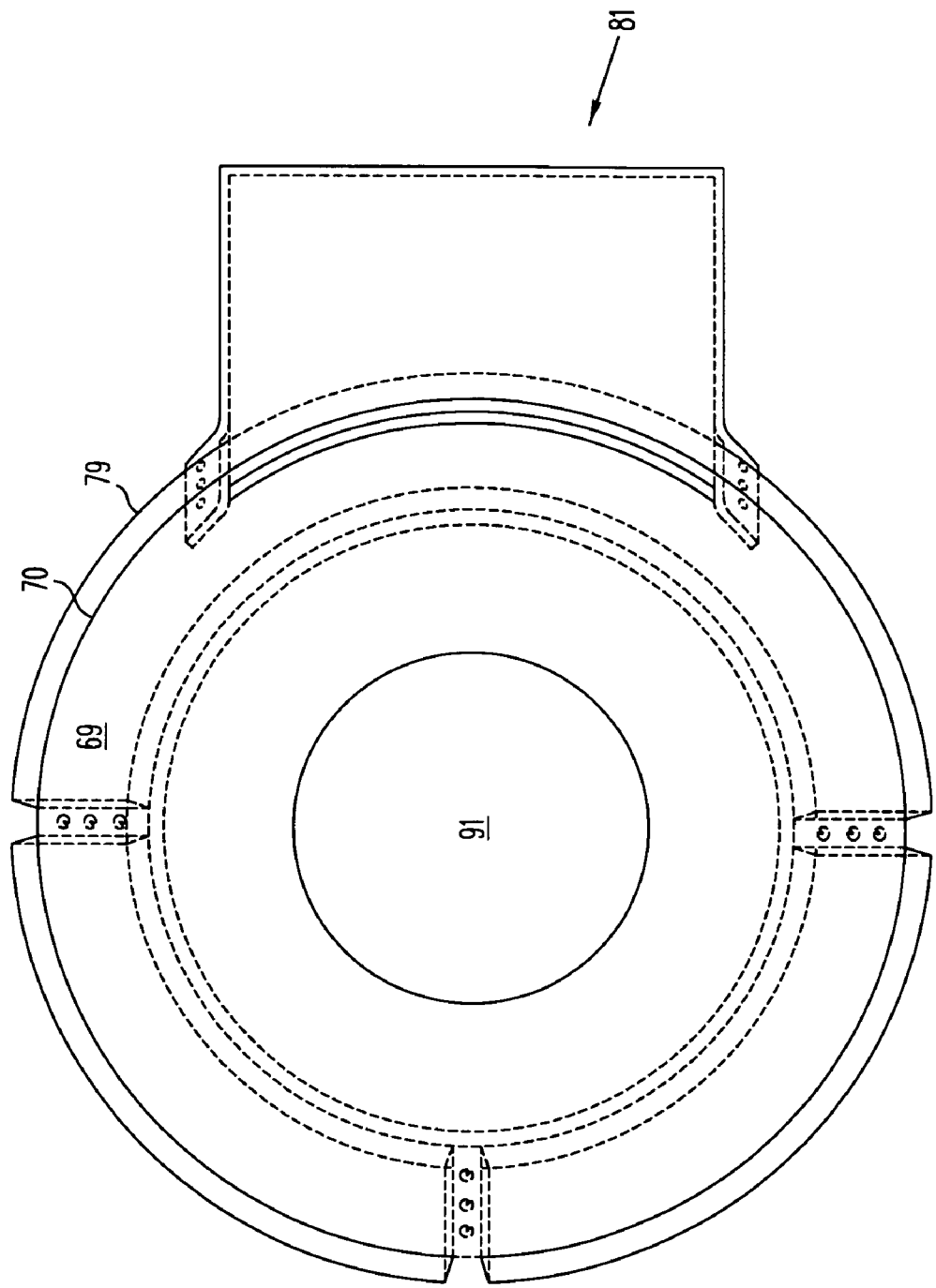
FIG. 16 is a bottom view taken along the lines 16-16 of FIG. 14.

As will be appreciated by reference to FIGS. 14-16, a zone 85 within the interior of the cooker to smoker adapter 68 is provided to receive fuel and smoke producing material and with the structures illustrated the burning fuel provides little if any radiant heat to food included within a cooker.

FIG. 15 is a top plan view of cooker to smoker adapter 68 and more clearly illustrates aperture 82 through which fuel may be inserted to replenish the supply as needed. Also, in FIG. 15, the rivets 77 and 83 are also illustrated. As illustrated in FIG. 15, peripheral edge 90 of chute 81 which is attached to the outer wall 72 also using rivets 83 for example. Although rivets are described as the means for attaching the inner and outer walls, 69 and 72 respectively, to each other, and to attach chute 81 to outer wall 72, other well-known techniques may be utilized such as for example spot welding.

Bowl 78 may be conveniently retained within the zone defined by inner wall 69 by use of for example of an appropriate bowl that is manufactured with a substantial shoulder or rim on the top edge of the bowl. Such a rim will allow the bowl to be supported by the upper edge 71 of wall 69. As illustrated in FIG. 16, which is a view taken along the lines 16-16 of FIG. 14, bowl 78 terminates at the lower edge 91 which is the lower surface of the bowl 78. Bowl 78 need not have any particular volume or any particular shape, however it may be adjusted in size as needed and as appropriate to retain a sufficient amount of liquid over a desired period of time. The upper edge of bowl 78 is indicated by reference character 92. Bowl 78 may be constructed in any suitably heat resistant material such as, for example, stainless steel.

Figure 17:
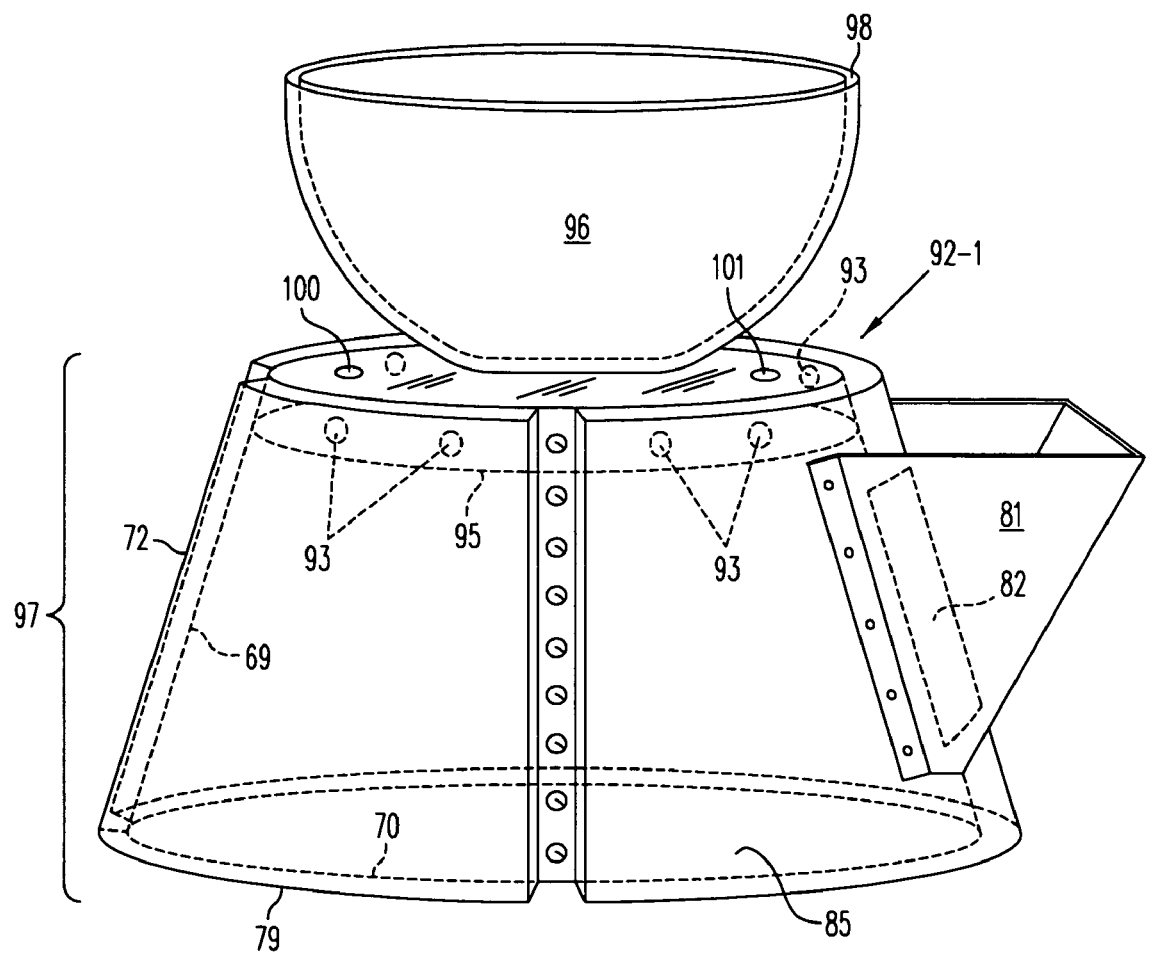
FIG. 17 is a perspective view of the sixth embodiment of the present invention.
Figure 18:
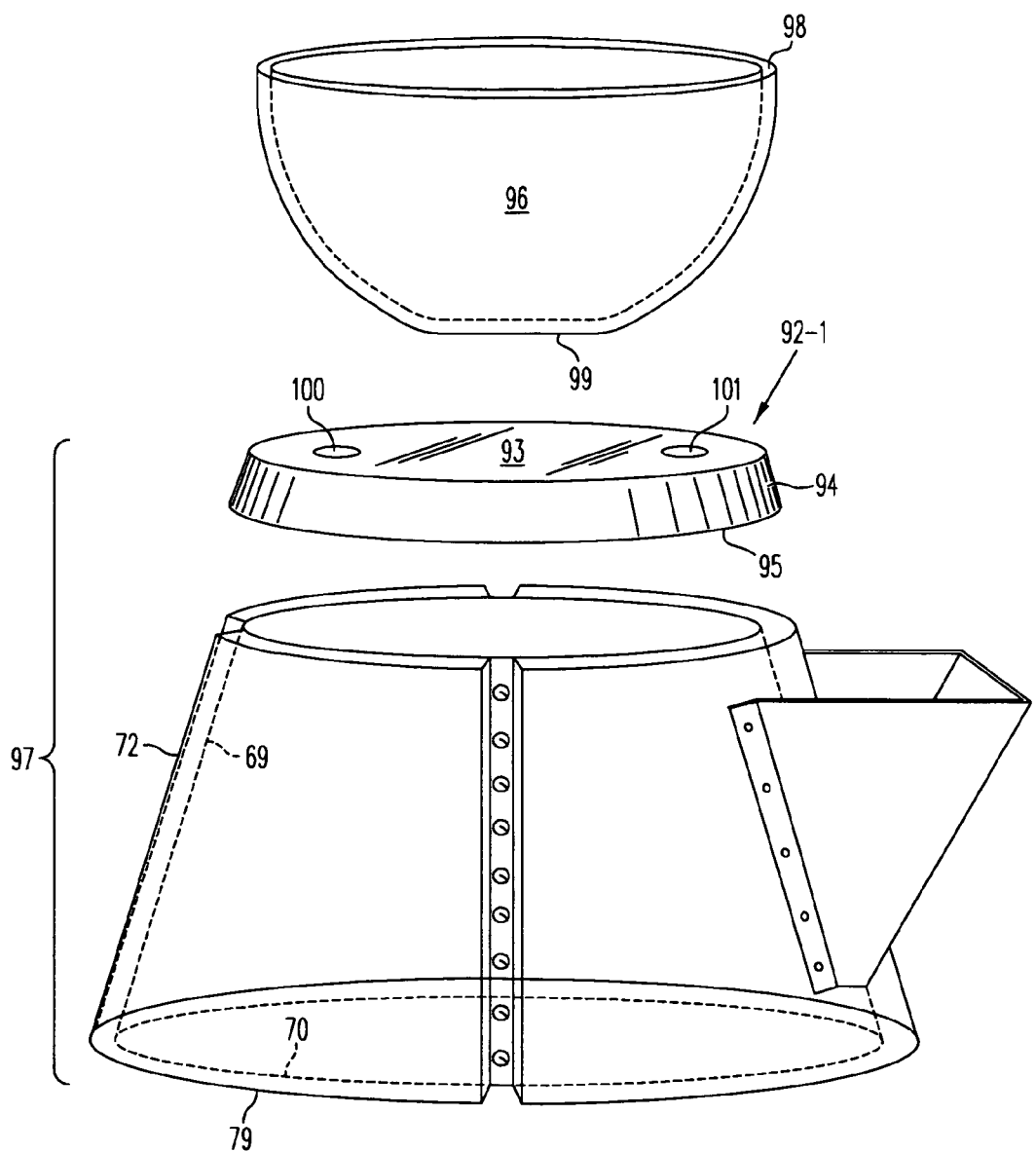
FIG. 18 is an exploded view of the embodiment illustrated in FIG. 17.

The sixth embodiment of the present invention is illustrated in FIGS. 17 and 18. As will be appreciated by reference to FIGS. 17 and 18, a cap 92-1 is supported on the inner wall 69 and secured to it by suitable fastening means, such as, for example, rivets 93. As an alternative to rivets, spot welding or other suitable attachment means may be utilized. Cap 92-1 includes an upper flat surface 93 and a downwardly extending wall 94 (FIG. 18) which is constructed having an angular relationship and a diameter suitable to fit within the upper portion of inner wall 69. Peripheral wall 94 terminates at a lower peripheral edge 95. Apertures 100 and 101 are provided in cap 92 to provide an air flow path through cooker to smoker adapter 97. These apertures may not be required in all embodiments since air flow through aperture 82 may be sufficient. Cooker to smoker adapter 97 as illustrated in FIGS. 17 and 18 provides a convenient zone 85 for receiving and holding fuel to be burned during a smoking process. As indicated with the embodiments in FIGS. 14-16, the lower edge of walls 69 and 72 would rest on a suitable fuel supporting structure, for example, if a grill of the type illustrated in FIG. 1 for example was utilized the cooker to smoker adapter 97 would rest on the fuel support grill 4. In the embodiments illustrated in FIGS. 17 and 18, moisture may be added during the smoking process by the inclusion of a bowl 96 which rests on surface 93 of the cap 92. With the bowl 96 resting in this position on the top of the cap 92 it is easy to add additional water as needed for providing moisture into the environment for the suitable smoking procedure.

FIG. 18 illustrates the embodiment of the cooker to smoker adapter 97 of FIG. 17 and for better appreciation of the structure is illustrated in an exploded view. The rim of bowl 96 is indicated by reference character 98 and the base of bowl 96 by reference character 99. Bowl 96 may be constructed by any material which is suitable for the heat typically encountered in a cooker utilized in smoking food, which may be for example stainless steel.

Figure 19:
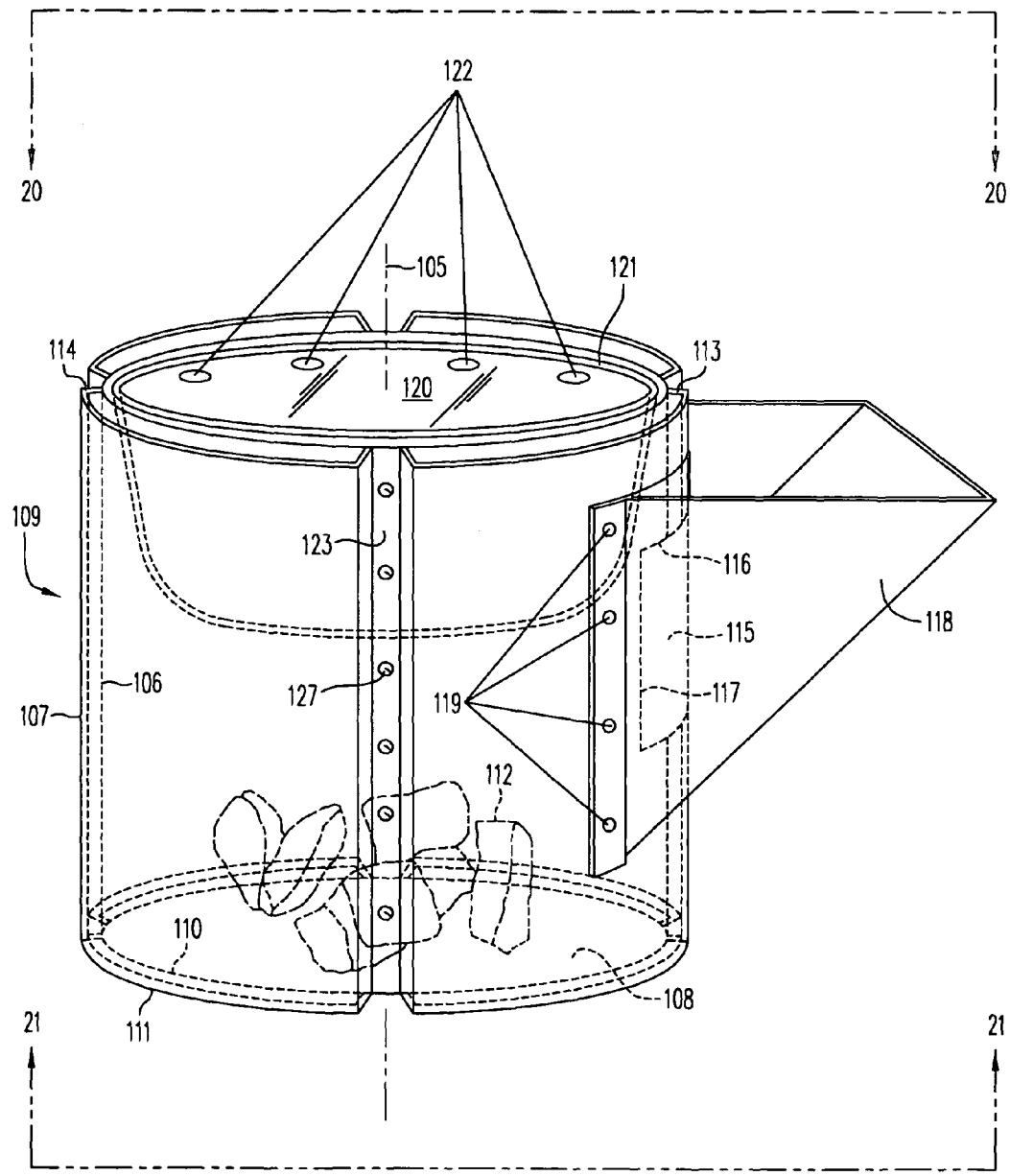
FIG. 19 is a perspective view of a seventh embodiment of the present invention.
Figure 20:
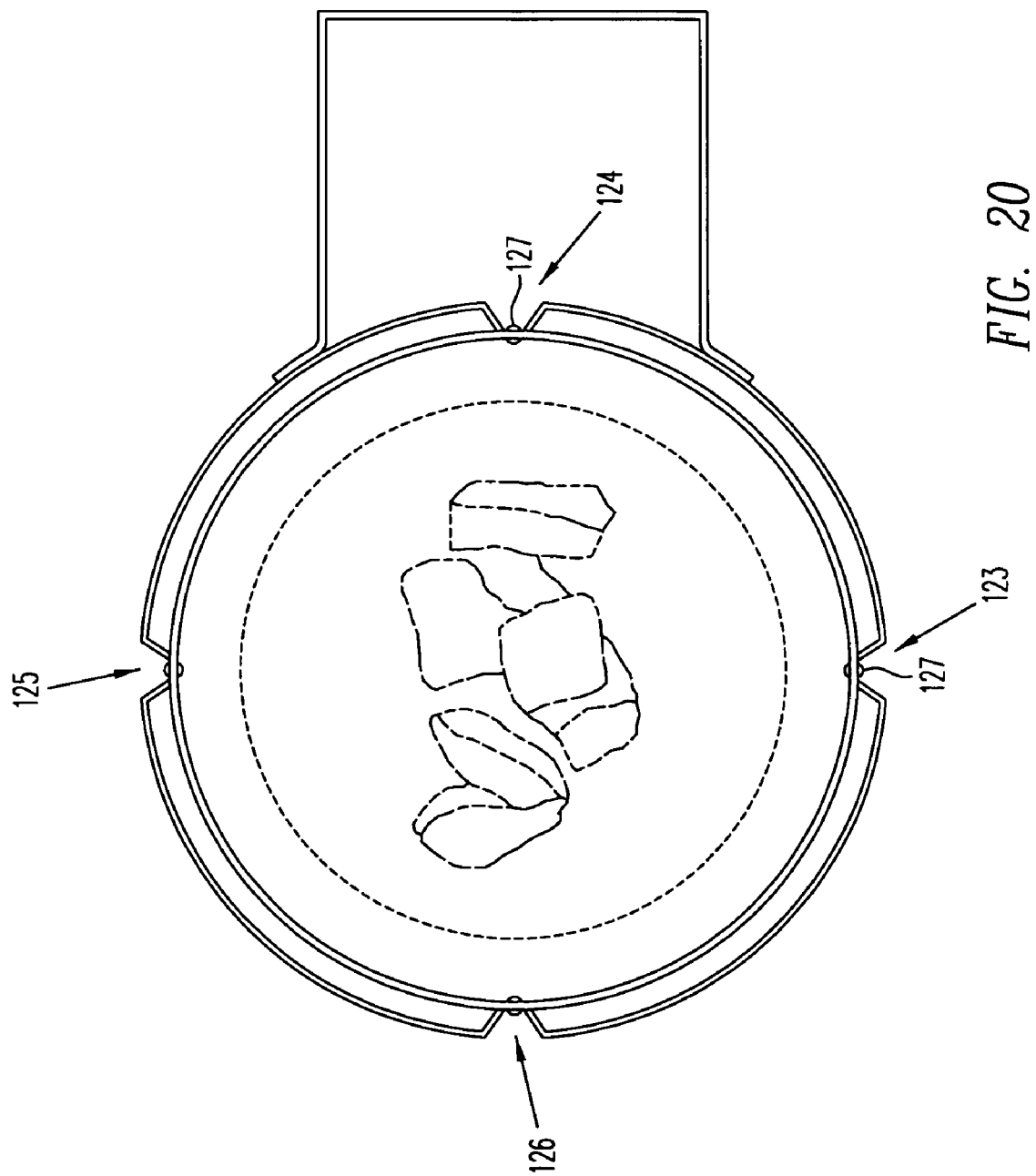
FIG. 20 is a view taken along the lines 20-20 of FIG. 19.
Figure 21:
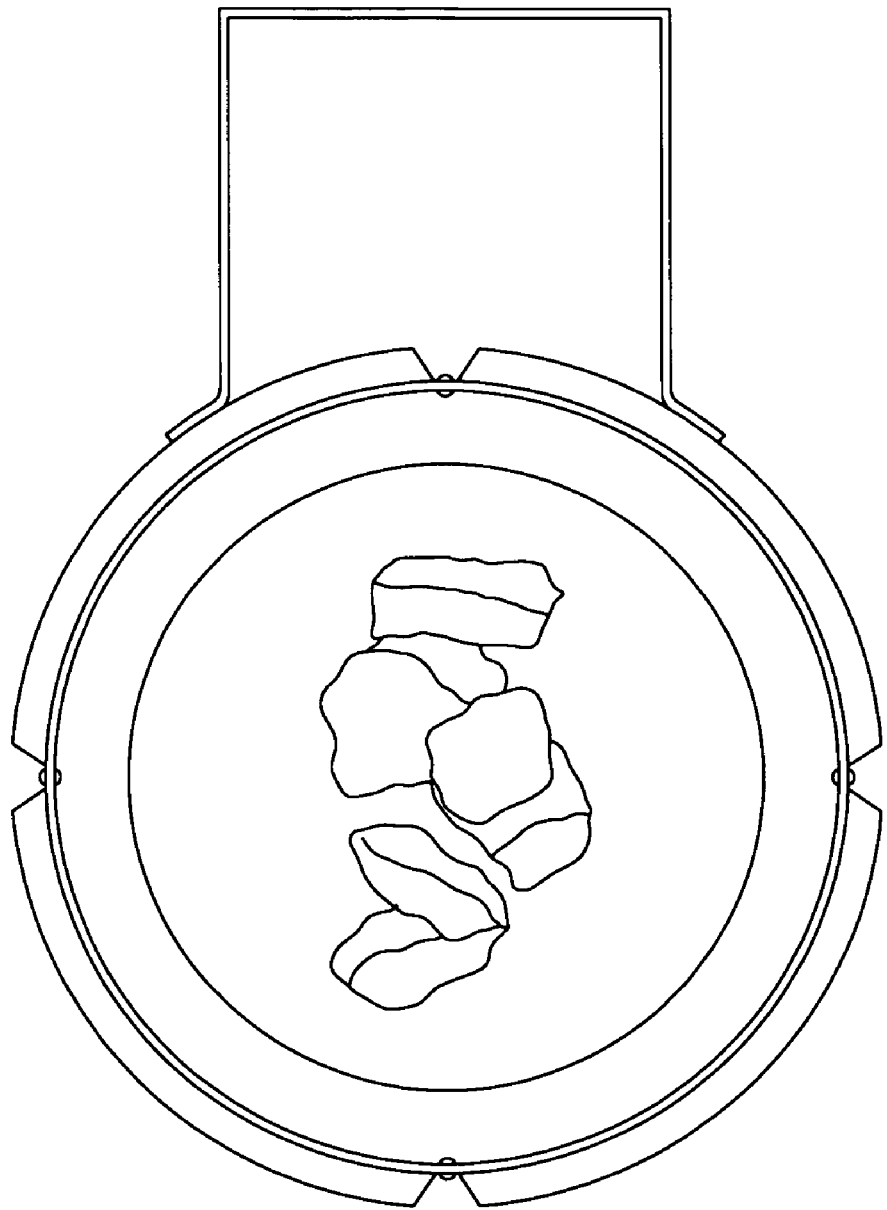
FIG. 21 is a view taken along the lines 21-21 of FIG. 19.

Turning to FIG. 19, a seventh embodiment of the present invention is illustrated. FIGS. 20 and 21 are views taken as indicated in the view lines in FIG. 19. In the embodiment illustrated in FIGS. 19, 20 and 21, the cooker to smoker adapter utilizes a pair of walls which are cylindrically and concentrically positioned about a central axis denoted by reference character 105. Referring to FIG. 19, a first cylindrical inner wall 106 forms a cylindrical portion and an outer wall 107 is connected to inner wall 106 in the manner such as illustrated in the embodiment disclosed in the previous figures using, for example rivets or alternatively spot weld technique. The inner and outer walls form a fuel zone 108. Cooker to smoker adapter 109, as in the prior embodiments, would be placed on a fuel support grill of a cooker. Thus the lower edges 110 and 111 of inner and outer walls 106 and 107 respectively would rest on the fuel supporting grill. For purposes of illustration, fuel in the form of charcoal briquettes indicated by reference character 112 are shown the position in fuel zone 108 as they would be located if the cooker to smoker adapter 109 were placed on a fuel supporting grill or other fuel supporting structure. Inner wall 106 terminates at its upper edge at 113 and outer wall 107 terminates at an upper edge 114.

As pointed out above with respect to the previous embodiments for example in FIGS. 14-18, in this embodiment, as well as the previous embodiments although first and second adjacent walls are illustrated, the present invention may be practiced by using a single wall structure to create the cooker to smoker adapter. Utilization of a dual wall does provide however the advantage of additional shielding and prevention of the direction of radiant heat toward the food being smoked.

In the fashion similar to that utilized in the embodiments in FIGS. 14-18, cooker to smoker adapter 109 includes an aperture 115 which extends through walls 106 and 107 and permits the easy addition of additional fuel is required. Dashed lines 116 and 117 illustrate the horizontal and vertical, respectively, of perimeters of aperture 115. Chute 118 is also provided to facilitate the ease of insertion of fuel and smoke producing material through aperture 115 into the fuel zone 108. Although chute 118 is shown in this embodiment, it is utilized for convenience and is not necessary in practicing the present invention. Chute 118 may be conveniently attached to the outer surface of wall 107 utilizing rivets 119 or other suitable fastening structures.

In cooker to smoker adapter 109 a bowl or reservoir 120 is positioned and extends within the interior of cylindrical portion of the cooker to smoker adapter defined by inner wall 106. Bowl or reservoir 120 terminates at an upper edge indicated by reference character 121. Bowl 120 may be secured to wall 106 utilizing a rivet as indicated by reference character 122 or alternatively by use of spot welds or other suitable attachment structures. Alternatively, bowl 120 could be constructed with a lip so that the bowl would be supported by edge 113.

FIG. 20 illustrates a top view taken along lines 20-20 of FIG. 19. In FIG. 20, it will be appreciated how the outer wall 107 is formed to provide four channels indicated by reference characters 123, 124, 125 and 126 which facilitate the attachment of outer wall 107 to inner wall 106. Outer wall 107 may conveniently be attached to inner wall 106 at these channel locations where the outer wall 107 touches the outer surface of inner wall 106 by use of rivets indicated by reference character 127. Alternatively, other attachment means such as spot weld or similar techniques may be utilized.

Figure 22:
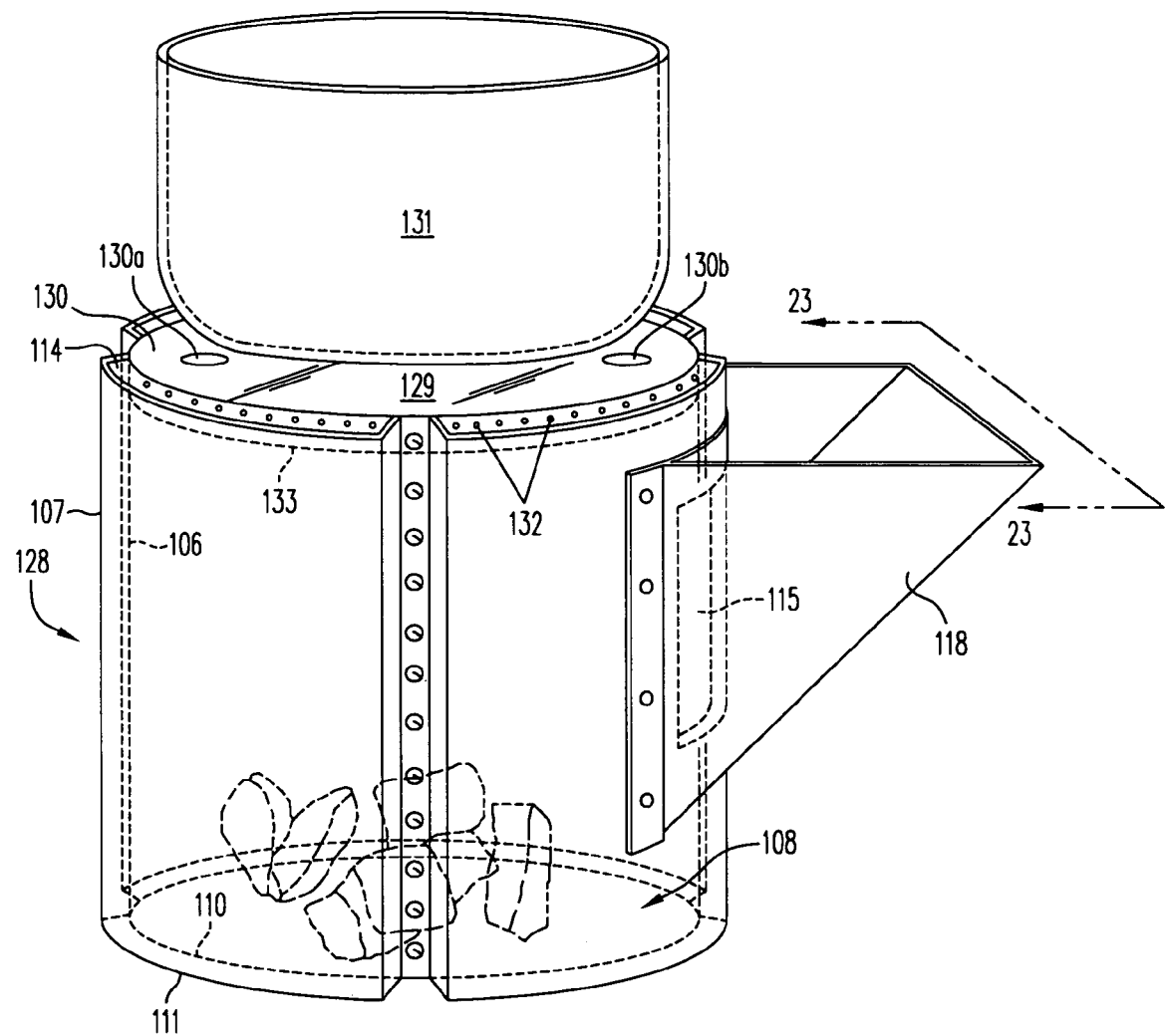
FIG. 22 illustrates an eighth embodiment of the present invention.

Turning to FIG. 22, an eighth embodiment of the present invention is illustrated in a perspective view. In many respects, as will be appreciated by reference to FIGS. 19, 20 and 21, the cooker to smoker adapter 128 illustrated in FIG. 22 includes similar features. However, in cooker to smoker adapter 128 a cap or top cover 129 is provided to close the upper end of the cooker to smoker adapter and provide the fuel retaining zone 108. Cap 129 may be constructed in a manner similar to that illustrated in FIG. 18 in which the cap is designed to fit and interface within the inner perimeter of wall 106. Cap 129 includes an upper surface 130 for supporting reservoir 131. Cap 129 may be secured to wall 106 utilizing spot welds or rivets indicated in this figure by reference character 132. The lower edge of cap 129 is indicated by the dashed lines denoted by reference character 133. Apertures 130a and 130b may be included in cap 129 to increase air flow through the cooker to smoker adapter. Alternatively, top cover 129 could include a lip so that it would extend over the edges of walls 106 and 107.

Figure 23:
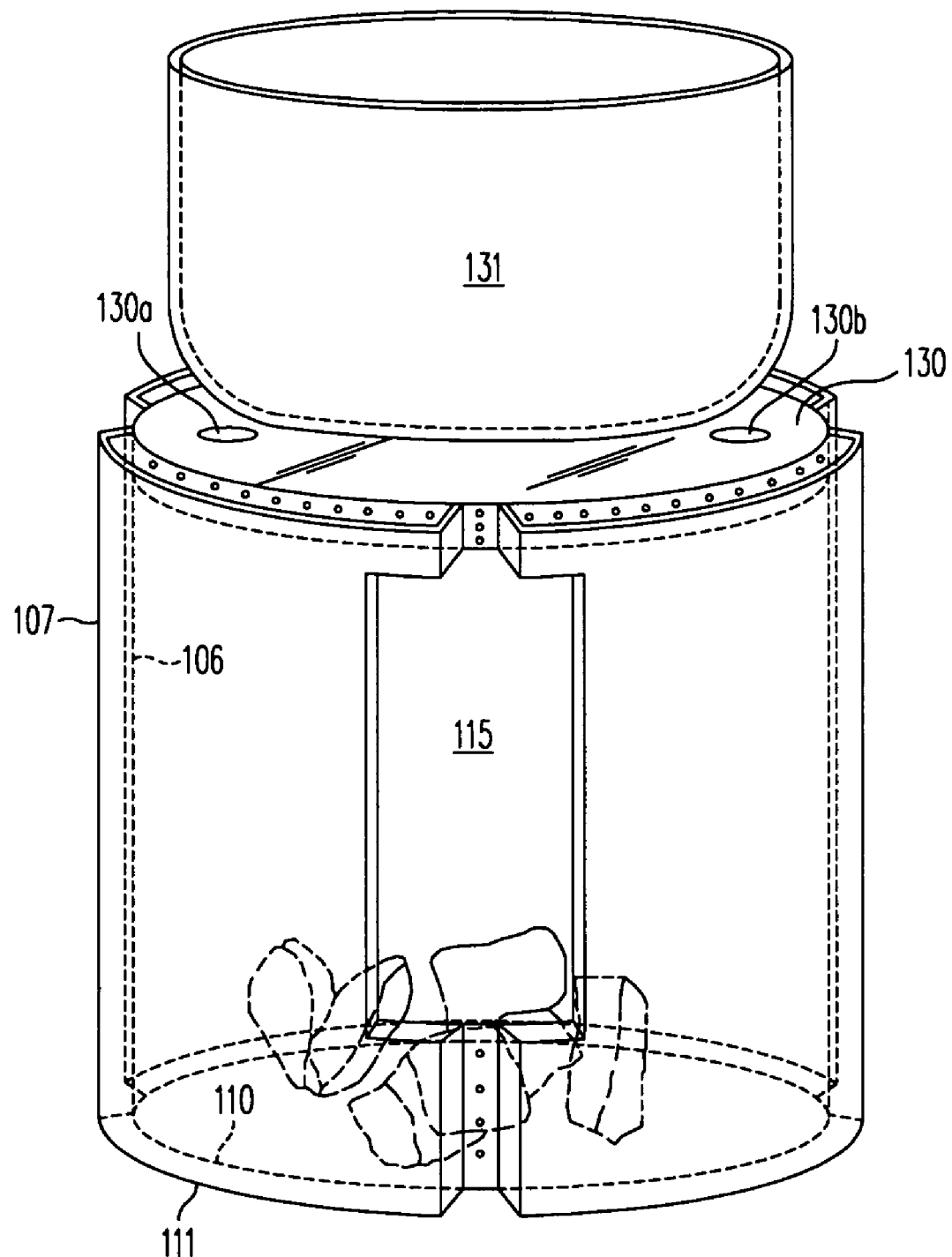
FIG. 23 is a view taken along the lines 23-23 of the embodiment illustrated in FIG. 22.

Turning to FIG. 23, the cooker to smoker adapter 128 illustrated in FIG. 22 is shown in a view taken along the lines 23-23 of FIG. 22. For illustration purposes the chute 118 has been eliminated and the aperture 115 is clearly shown. Aperture 115 does not require any particular configuration and the size is not important, however it needs of course to be sufficiently large to permit the insertion of fuel and smoke producing material into fuel zone 108.

A ninth embodiment of the present invention is illustrated in FIGS. 24-27. In this embodiment, which in many respects is similar to earlier embodiments, a portion of a grill is utilized to create a zone for fuel to be utilized to convert a cooker into a smoker apparatus. In the earlier embodiments, for example as illustrated in FIGS. 1-13, the cooker to smoker adapter will conveniently be utilized with a standard hemispherical-type grill, or grills of other shapes, without the modification of the basic structure of the existing cooker. In contrast, in connection with the embodiment illustrated in FIGS. 24-27, additional structure is provided on the cooker to support structures utilized in the cooker to smoker adapter in this embodiment.

Figure 24:
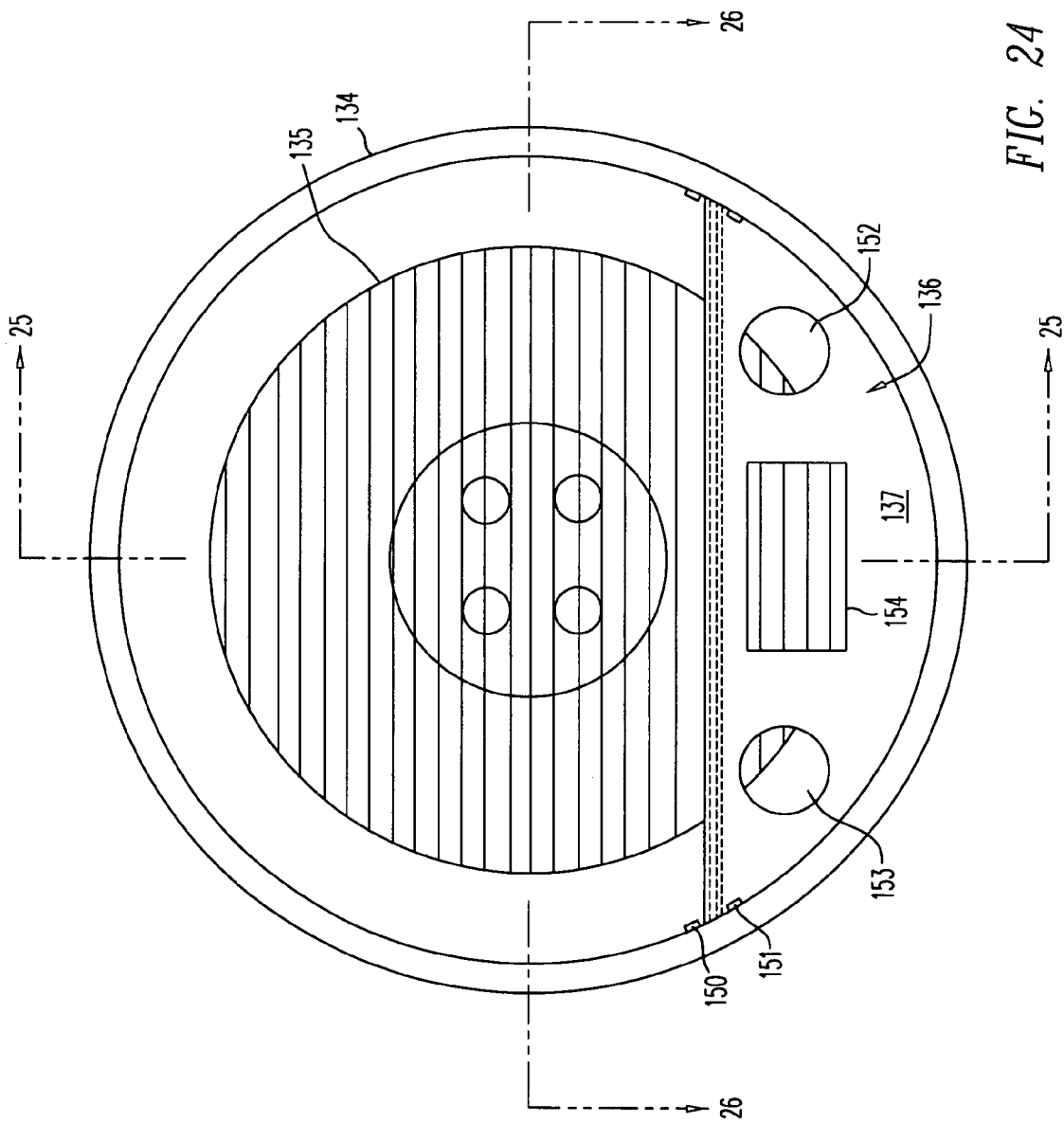
FIG. 24 is a top plan view of a ninth embodiment of the present invention.
Figure 25:
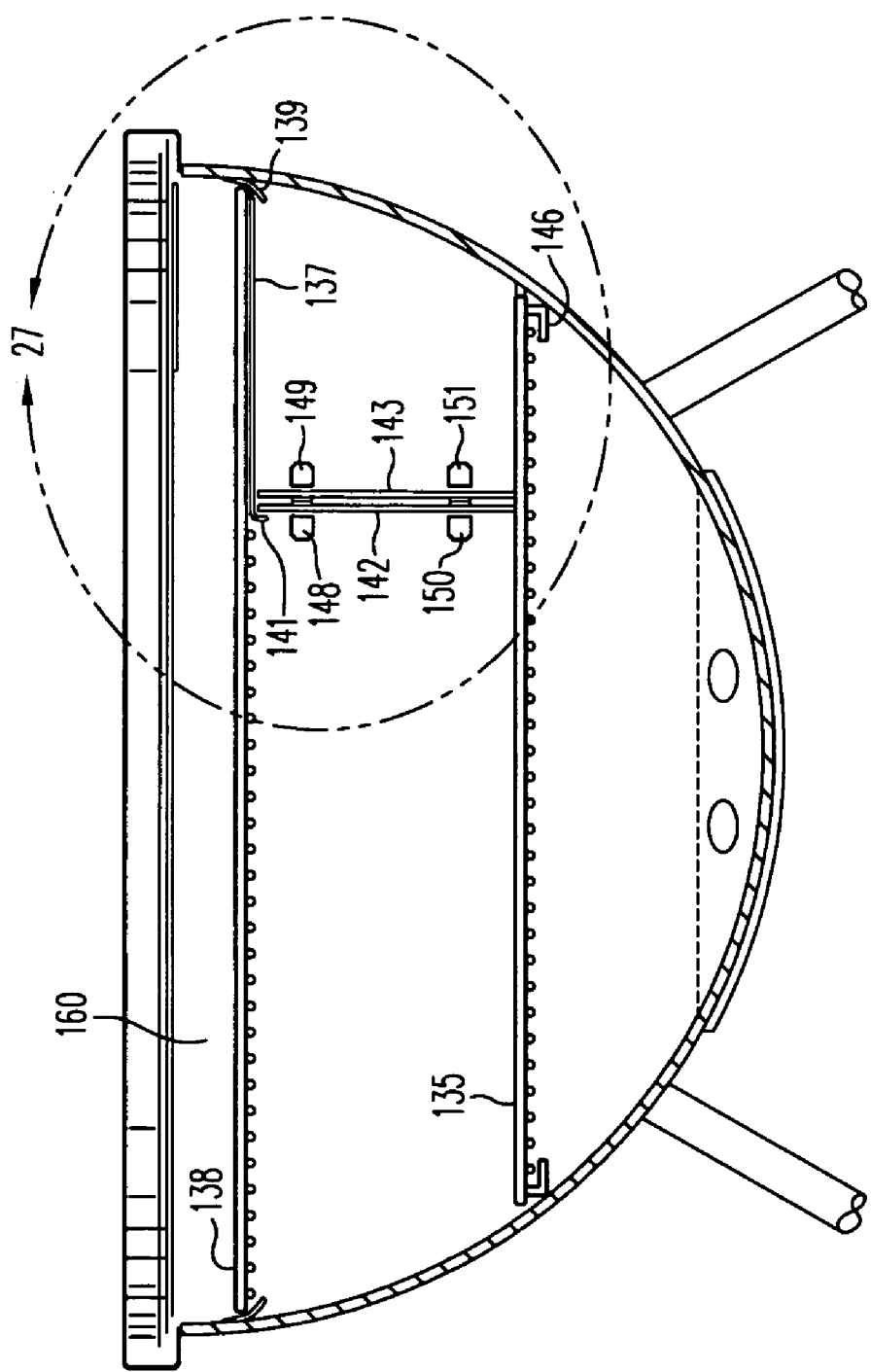
FIG. 25 is a view taken along the lines 25-25 of FIG. 24.
Figure 27:
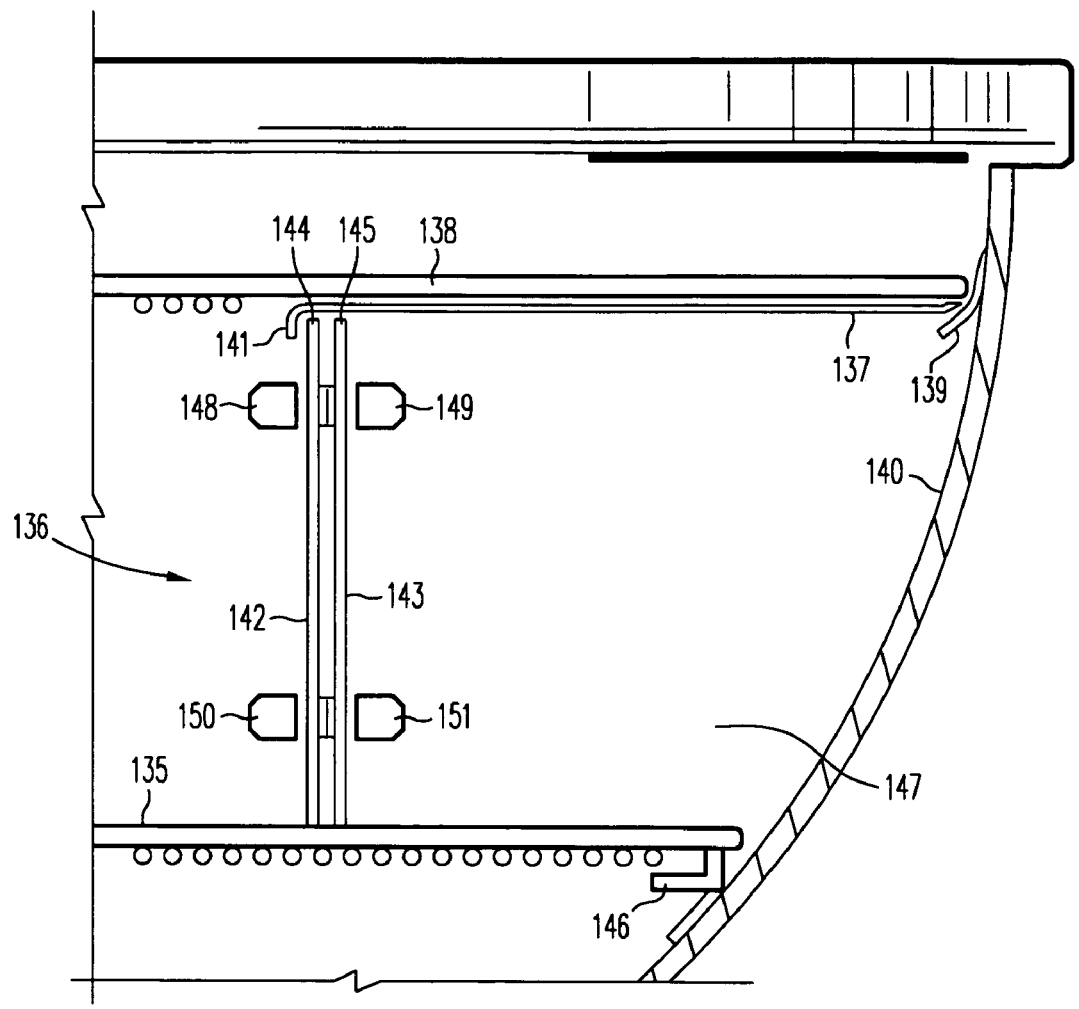
FIG. 27 is an enlarged view of the portion of the structure illustrated in FIG. 25 which has been circled.

Referring to FIG. 24, which is a top plan view of a hemispherically-shaped cooker, without the top in place, base 134 is shown along with fuel support grill 135, with cooker to smoker adapter 136 positioned in place within the interior of base 134. Cooker to smoker adapter 136 is produced using an upper wall portion 141? which is constructed as a wall which may be of a similar material such as that described in prior embodiments, for example of FIG. 1. Upper wall portion 137 141? is also illustrated in FIG. 27 which is an enlargement of the circled portion in FIG. 25. In this embodiment, upper wall portion 141? is positioned immediately below food support grill 138 as is clearly shown in FIG. 27. As illustrated in FIG. 27, the right hand edge of upper wall portion 141 is supported by tab 139 which extends from wall 140 of cooker 134. As will be best appreciated by reference to FIG. 27, the right hand end to the 141 of upper wall portion 137 as noted above rests on tab 139, and the opposite end of upper wall portion 137, indicated by reference character 141, is supported by the upper end of walls 142 and 143, these upper ends being indicated by reference characters 144 and 145. As illustrated in FIG. 27, the lower side of upper wall portion 137 is for illustration purposes separated from ends 144 and 145, end 144 and 145 are not labeled in FIG. 27 however of course in normal operation the indicated space is not provided because end 141 would be supported on walls 142 and 143 at ends 144 and 145. The lower ends of walls 142 and 143 are supported on fuel support grill 135. As viewed in FIG. 27, the right hand end of fuel support grill 135 is supported by tab indicated by reference character 146, the tab extending from interior wall 140 from the cooker. The walls 142? and 143 in conjunction with the outer wall of the cooker provide a fuel containment zone 147. Fuel, not shown, will be placed on the upper portion of fuel support grill 135 within the fuel containment zone.

In this embodiment, tabs indicated by reference characters 148, 149, 150 and 151 extend from the inner wall of the cooker structure and provide support of walls 142 and 143 to maintain them in the vertical position, vertical as illustrated in FIG. 27. The number of tabs is of course arbitrary, and in the embodiment shown in FIG. 27, since the end 141 of wall portion 137 is curved downwardly, plates 142 and 143 could be maintained in place by utilization of only tabs 150 and 151. The number and placement of tabs is of course a design choice. Alternatively, a single vertical wall could be used, rather than using two as shown in the above-described embodiment.

Returning to FIG. 24, upper wall portion 137 includes apertures 152 and 153 to permit the addition of fuel into the fuel containment zone 147. Also, rectangular aperture which is indicated by reference character 154 is provided to support a reservoir for liquid, the reservoir not being shown in this figure. However, a reservoir of the type illustrated in FIG. 1 would be usable in this configuration.

Figure 26:
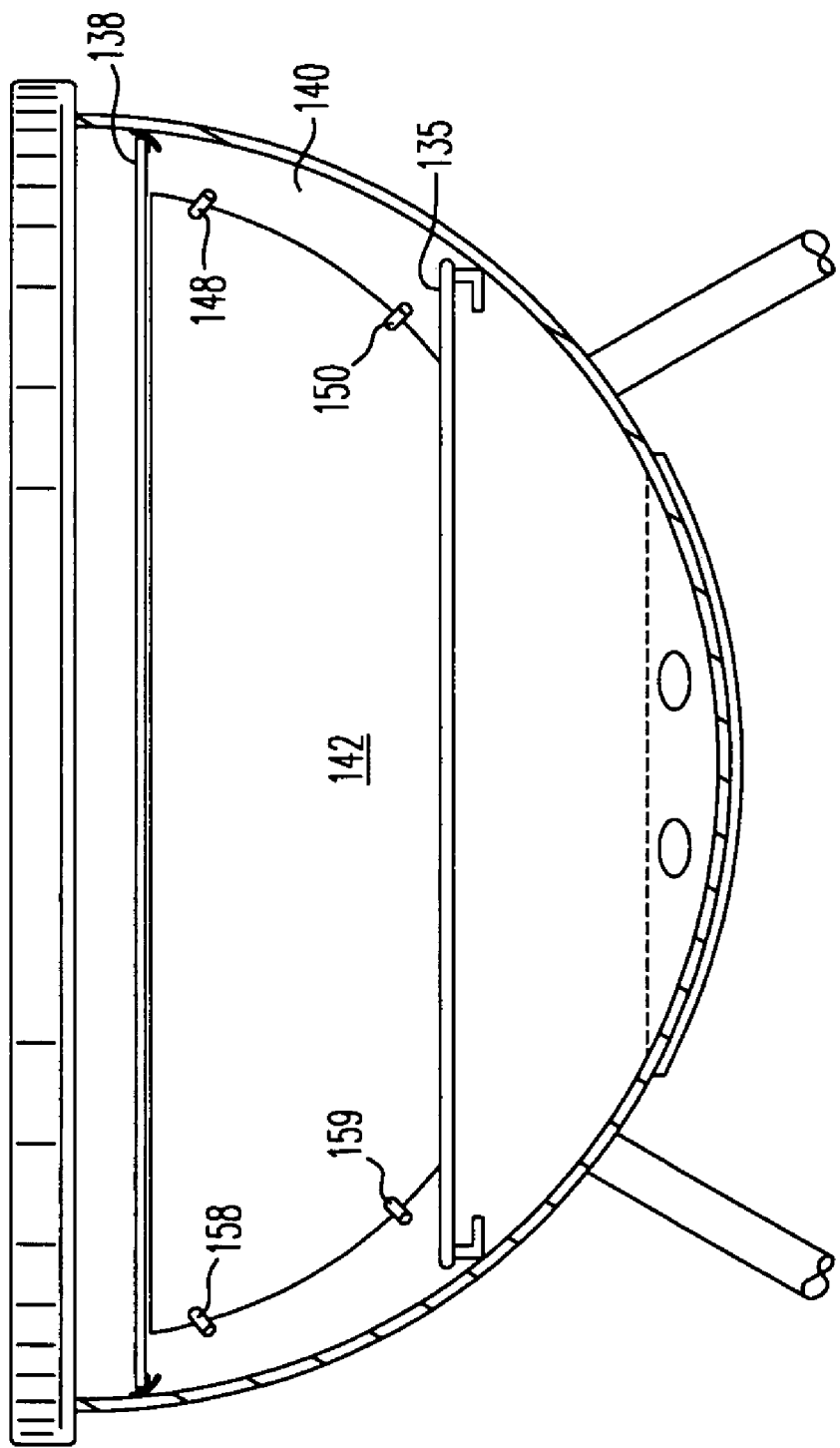
FIG. 26 is a view taken along the lines 26-26 in FIG. 24.

Turning to FIG. 26, which is a view taken along the lines 26-26 of FIG. 24, it will be noted that wall 142 extends from side to side on the interior of cooker base 134 and in the similar fashion to that illustrated in FIG. 27, tabs 158 and 159 extending from the interior of the cooker wall support the left hand edge of wall 142. Referring to FIG. 25, in utilizing the cooker to smoker adapter in the grill, typically food will be placed in the zone indicated by 160. In this position, substantially all of the radiant heat from fuel source contained within fuel zone 147 would not impact the food placed in this position. Accordingly, an exemplary smoking environment would be provided.

Figure 28:
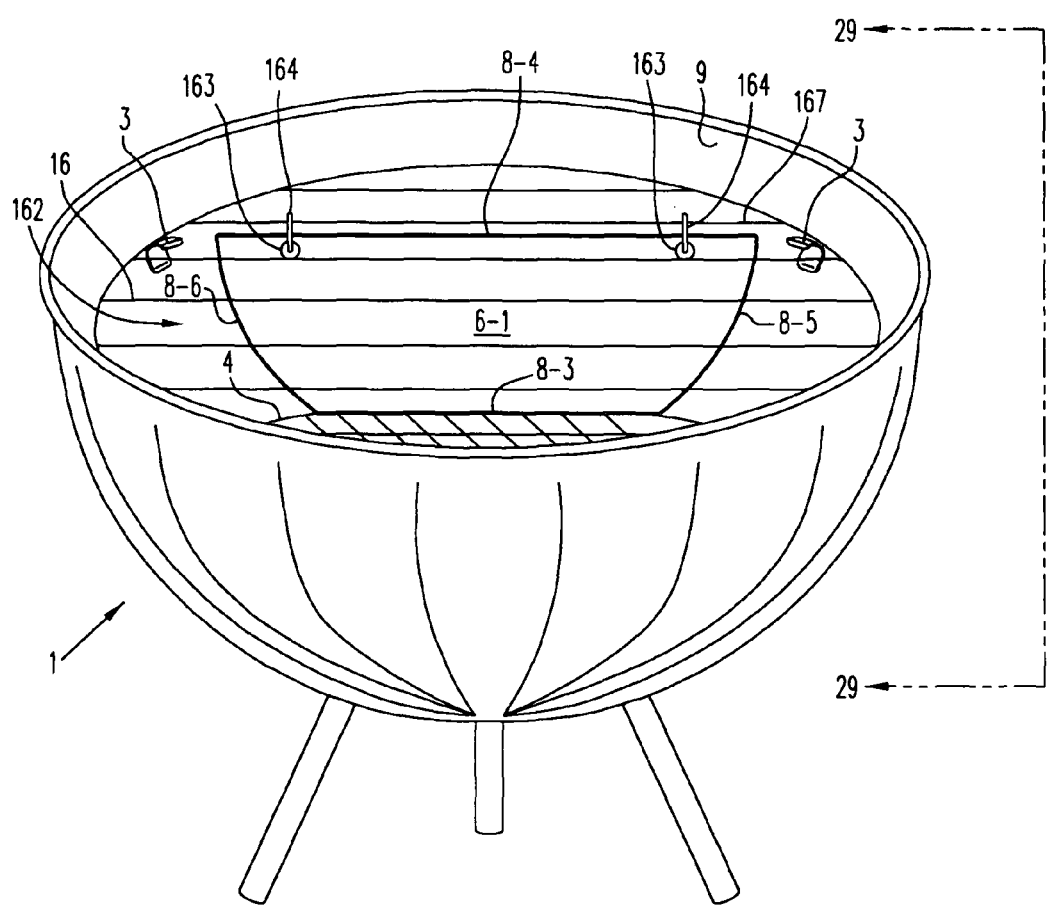
FIG. 28 is a perspective view of another embodiment of the present invention.

According to FIG. 28, another embodiment of the present invention is disclosed in a perspective view. As will be appreciated by reference to earlier figures, a number of common elements are utilized in the structure disclosed in FIG. 28 and accordingly, further description thereof is not provided.

Figure 29:
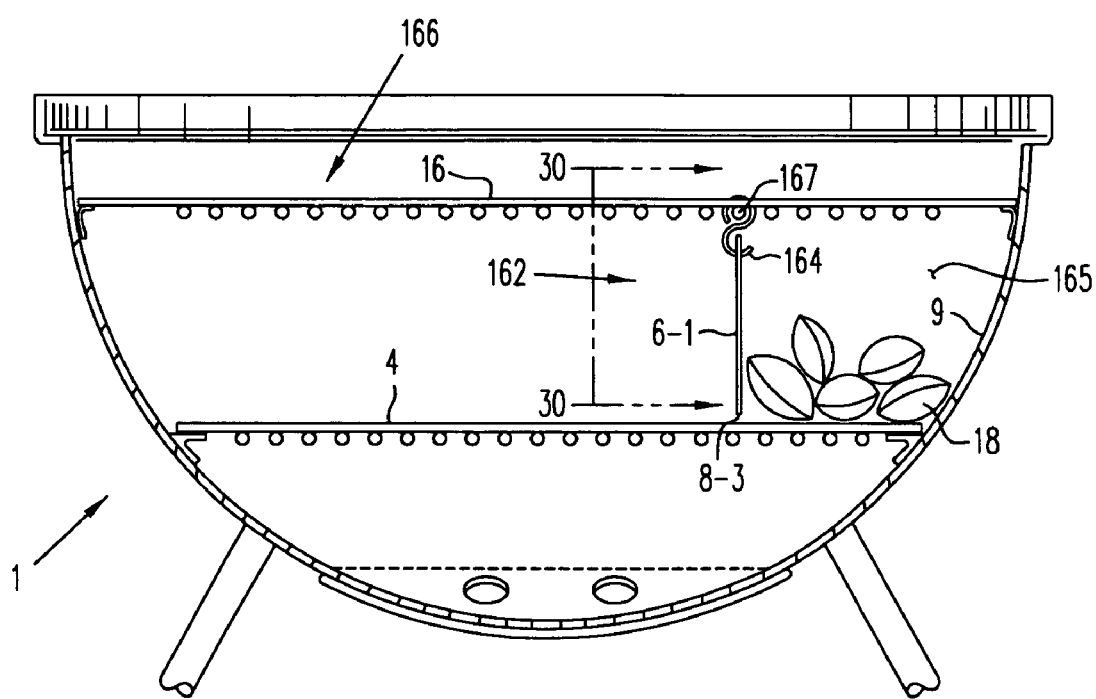
FIG. 29 is a cross-sectional view taken along the line 29-29 of FIG. 28.
Figure 31:
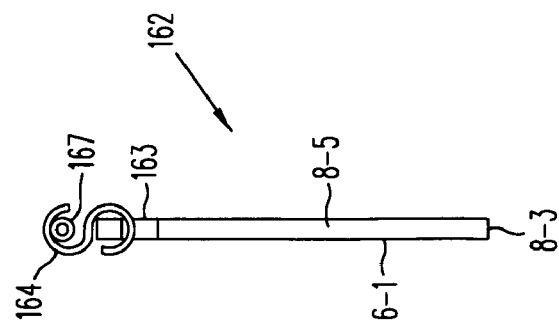
FIG. 31 is a view taken along lines 31-31 of FIG. 30.

In this embodiment, wall 6-1 is supported on food supporting grill 16 in a location adjacent to an edge of cooker 1, and as will be appreciated by reference to FIG. 29, defines fuel containment zone 165. When using the embodiment illustrated in FIGS. 28-31 to function as a smoker apparatus, wall 6-1 separates the fuel containment zone 165 from the areas to the left of wall 6-1 to provide a zone in the general area indicated by reference character 166 above food support grill 16 where food would be placed. Wall 6-1 accordingly functions to reduce direct heat radiation to a food substance placed in zone 166 or in that general region. Thus when fuel 18 is burning, wall 6-1 prevents direct heat radiation from the fuel in fuel containment zone 165 to regions on the food support grill 16. Although not shown, a container for water or other suitable liquid can be supported above the fuel containment zone 165 by food support grill 16, thereby providing moisture into the cooking environment created with the grill and wall 6-1. Wall 6-1 may be constructed utilizing the materials of the type described above with regard to the cooker to smoker adapters such as 5, 22, 31 and 136.

Figure 30:
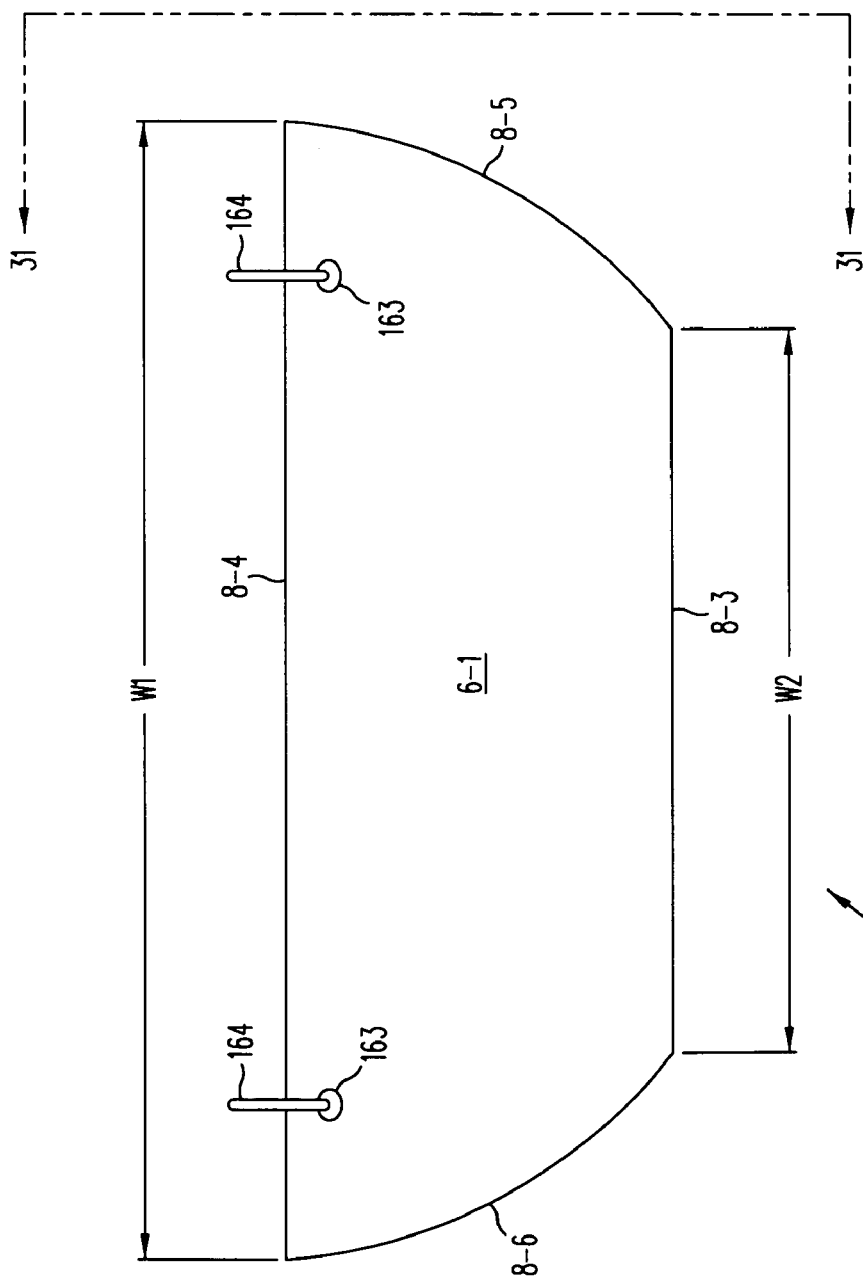
FIG. 30 is a view taken along lines 30-30 in FIG. 29.

Referring to FIGS. 28 and 30, it will be noted that wall 6-1 includes an upper edge indicated by reference character 8-4, a lower edge indicated by reference character 8-3 and opposing opposite edges 8-5 and 8-6 respectively. To maximize the reduction of heat radiation from the burning fuel containment zone 165, edges 8-5 and 8-6 are configured to conform to the curvature of the interior surface 9 of cooker 1. In FIG. 30, Width W1 of the upper edge 8-4 wall 1 is sufficient such that when wall 6-1 is placed into operative relationship with cooker 1 the ends of wall 6-1 at upper edge would fit closely to the inner surface 9 of the cooker. Similarly, width W2 is such that the lower edge 8-3 at its opposite ends will fit closely to the inner surface 9.

In the embodiment illustrated in these figures, wall 6-1 includes a pair of apertures indicated by reference character 163 and support structures are indicated by reference character 164 have one portion that extends through the aperture 163 and another portion which extends upward and around a rod 167 which is a portion of food supporting grill 16. In this particular embodiment, support structure 164 are conveniently formed in an 'S' shape, however it will be appreciated that various designs may be utilized to support wall 6-1 in a position adjacent to one portion of the cooker 1.

FIG. 32 illustrates cooker to smoker adapter 168 in a view which is taken in the same perspective as cross sectional view 30-30 in FIG. 29. In FIG. 32, cooker to smoker adapter 168 is comprised of a wall 6-2 having an upper edge 6-3, lower edge 6-4, and opposing edges 6-5 and 6-6. Wall 6-2 is configured with dimensions to provide the same fitting relationship with respect to the interior of cooker 1 as that described in connection with cooker to smoker adapter 162 in the prior embodiment. To provide support for wall 6-1 from food support grill 16, wall 6-2 includes extending from upper edge 6-3 a pair of projections indicated by reference characters 169 and 170. As will be appreciated by reference to FIG. 33, projection 170 extends outwardly and downwardly from top edge 6-3, thus providing a hook structure to conveniently fit over rod 167 (not shown). Aperture 171 would be conveniently sized to fit with the anticipated dimension of a rod or other structure which would be used in the cooker to support food. In the manner following the structure shown in FIG. 30, the distance between upper edge 6-3 and lower edge 6-4 are configured such that the lower edge 6-4 extends above fuel support grill 4 the height (distance between upper edge 6-3 and lower edge 6-4 could be configured such that lower edge 6-4 extends below fuel support grill 4. That decision is a design choice. Although in the embodiment illustrated in FIG. 32 a pair of extensions 169 and 170 are used, it will of course be appreciated that more than two could be used and alternatively, a single projection extending from upper edge 6-3 could be utilized rather than a plurality of extensions.

Other embodiments of this invention will be obvious to those skilled in the cooking and food smoking arts in view of this disclosure.

What is claimed is:

1. A cooker to smoker adapter for converting a cooker structure to a smoker, the cooker structure having one or more interior walls enclosing a cooking space, the cooker to smoker adapter comprising:
an attachment member adapted for attaching the cooker to smoker adapter to the interior walls, so as to secure the cooker to smoker adapter inside the cooking space;
a first wall of material positioned in a first plane; and
a second wall of material positioned in a cooperative relationship with the first wall, the second wall of material being positioned in a second, different plane, wherein the second wall includes a first aperture.

2. The adapter according to claim 1, wherein an angle between the first plane and the second plane is ninety degrees.

3. The adapter according to claim 1, wherein the second wall includes at least a second aperture.

4. The adapter according to claim 1, wherein the second wall includes a second aperture adapted to support a container.

5. The adapter according to claim 4, further comprising a container supported in the second aperture.

6. The adapter according to claim 4, wherein the second wall includes a third aperture.

7. The adapter according to claim 5, wherein the second wall includes a third aperture.

8. The adapter of claim 1, further comprising a third wall of material supported on said first wall of material, wherein at least some portions of the third wall are supported in a spaced apart relationship with the first wall of material.

9. The structure according to claim 1, wherein the first wall of material is selected from the group consisting of sheet metal comprising carbon steel, stainless steel, or porcelain coated carbon steel.

10. The adapter according to claim 1, wherein at least a portion of a peripheral edge of the second wall is positioned in a parallel relationship with one of the one or more interior walls of the cooker.

11. The adapter according to claim 10, wherein at least a portion of a peripheral edge of the first wall is positioned in a parallel relationship with one of the one or more interior walls.

12. The adapter according to claim 1 wherein the structure of the cooker to smoker adapter is configured for use within a cooker having a hemispherically shaped interior wall, and further wherein a peripheral edge of the second wall is configured to parallel the interior wall.

13. The adapter according to claim 12, wherein a peripheral edge of the first wall is configured to parallel the interior wall.

14. The adapter according to claim 1 wherein the adapter includes a third wall of material attached to the second wall of material such that a reservoir for holding a liquid is provided.

15. The adapter according to claim 1 wherein the second wall includes a reservoir for holding a liquid.

16. The adapter according to claim 1 wherein the first wall of material and the second wall of material comprise an integral structure.

17. The adapter according to claim 1 wherein the first wall of material and second wall of material comprise separate structures.

18. The adapter according to claim 17, wherein the adapter further comprises a third wall of material attached to and supported in a spaced apart relationship with the first wall of material.

19. The adapter according to claim 18, wherein the structure is adapted for use within a cooker having one or more interior walls, and further wherein at least a portion of a peripheral edge of the second wall is configured to parallel one of the one or more interior walls of the cooker.

20. The adapter according to claim 19, wherein at least a portion of a peripheral edge of the first wall is configured to parallel one of the one or more interior walls.

21. The adapter according to claim 17, wherein the second wall includes at least a second aperture.

22. The adapter according to claim 17 wherein the second wall includes a second aperture adapted to support a container.

23. A cooker to smoker adapter for converting a cooker structure to a smoker, the cooker structure having an interior wall enclosing a cooking space, the cooker to smoker adapter comprising:
an attachment member adapted for attaching the cooker to smoker adapter to the interior wall, so as to secure the cooker to smoker adapter inside the cooking space;
a first wall of material positioned in a first plane; and
a second wall of material positioned in a second, different plane, the second wall including a reservoir formed integrally with the second wall.

24. The adapter according to claim 23 further comprising a third wall of material attached to and supported in a spaced apart relationship with the first wall of material.

25. The cooker to smoker adapter according to claim 23, wherein the first wall of material and the second wall of material comprise separate structures.

26. The cooker to smoker adapter according to claim 25 wherein the first wall of material is attached to the second wall of material at a location.

27. A cooker to smoker adapter for converting a cooker structure to a smoker, the cooker structure having an interior wall enclosing a cooking space, the cooker to smoker adapter comprising:
    an attachment member adapted for attaching the cooker to smoker adapter to the interior wall, so as to secure the cooker to smoker adapter inside the cooking space;
    a first wall of material positioned in a first plane; and
    a second wall of material positioned in a cooperative relationship with the first wall, the second wall of material being positioned in a second, different plane.

28. The adapter according to claim 27, wherein an angle between the first plane and the second plane is ninety degrees.

29. The adapter according to claim 27, wherein the second wall includes at least one aperture.

30. The adapter according to claim 29, wherein the at least one aperture is adapted to support a container.

31. The adapter according to claim 30, further comprising a container supported in the at least one aperture.

32. The adapter according to claim 27, wherein at least a portion of a peripheral edge of the second wall is positioned in a parallel relationship with one of the one or more interior walls of the cooker.

33. The adapter according to claim 32, wherein at least a portion of a peripheral edge of the first wall is positioned in a parallel relationship with one of the one or more interior walls.

34. The adapter according to claim 27, wherein the interior comprises a hemispherically shaped interior wall, and further wherein when the cooker to smoker adapter is positioned in an operative relationship with the interior wall a first portion of a peripheral edge of the second wall is spaced from the interior wall by a first distance and a second portion of the peripheral edge is spaced from the interior wall by a second distance greater than the first distance.

35. The adapter according to claim 34, wherein a peripheral edge of the first wall is configured to parallel the interior wall.

36. The adapter according to claim 34, wherein the second wall includes an aperture.

37. The adapter according to claim 36, wherein the aperture is adapted to support a container.

38. The adapter according to claim 27, wherein the adapter includes a third wall of material attached to the second wall of material such that a reservoir for holding a liquid is provided.

39. The adapter according to claim 27, wherein the second wall includes a reservoir for holding a liquid.

40. The adapter according to claim 27, wherein the first wall of material and the second wall of material comprise an integral structure.

41. The adapter according to claim 27, wherein the first wall of material and second wall of material comprise separate structures.

42. The adapter according to claim 41, wherein the adapter further comprises a third wall of material attached to and supported in a spaced apart relationship with the first wall of material.

43. The adapter according to claim 42, wherein at least a portion of a peripheral edge of the second wall is configured to parallel one of the one or more interior walls of the cooker.

44. The adapter according to claim 43, wherein at least a portion of a peripheral edge of the first wall is configured to parallel one of the one or more interior walls.

45. The adapter according to claim 41, wherein the second wall includes an aperture.

46. The adapter according to claim 45, wherein the aperture is adapted to support a container.

47. An accessory for use with a cooker apparatus having a food support structure and an interior wall enclosing a cooking space, the accessory comprising:
    a sheet of material sufficiently wide to fit within the cooking space of the cooker apparatus, the sheet of material including at one edge thereof an attachment structure adapted to support the sheet of material from the food support structure and dividing the cooking space into two portions.

48. The smoker structure according to claim 47, wherein the attachment structure is comprised of an aperture in the sheet of material and an associated hook-shaped structure, the hook-shaped structure having a first end associated with the aperture and a second end adapted to cooperate with the food support structure.

49. The smoker structure according to claim 47, wherein the sheet of material includes first and second edges adjacent to opposite ends of the one edge, and further wherein the first and second edges each have a curvilinear shape.

50. The smoker structure according to claim 47, wherein the sheet of material includes another edge opposite the one edge, and further wherein a width of the another edge is less than a width of the one edge.

51. The smoker structure according to claim 50, wherein the sheet of material includes a side edge which extends between the one edge and the another edge and further wherein the side edge has a curvilinear shape.

52. The smoker structure according to claim 47, wherein the composition of the sheet of material is selected from the group consisting of carbon steel, stainless steel, or porcelain coated carbon steel.

53. The smoker structure according to claim 47, wherein the attachment structure extends from the one edge.

54. The smoker structure according to claim 53, wherein the attachment structure is integral with the sheet of material.

55. The smoker structure according to claim 47, wherein the attachment structure comprises a plurality of tabs which extend from the one edge.

56. The smoker structure according to claim 55, wherein the tabs are integral with the sheet of material.

57. The smoker structure according to claim 53, wherein the attachment structure is hook-shaped.

58. The smoker structure according to claim 53, wherein the sheet of material includes first and second edges adjacent to opposite ends of the one edge, and further wherein the first and second edges each have a curvilinear shape.

59. The smoker structure according to claim 53, wherein the sheet of material includes another edge opposite the one edge, and further wherein a width of the another edge is less than a width of the one edge.

60. The smoker structure according to claim 59, wherein the sheet of material includes a side edge which extends between the one edge and the another edge and further wherein the side edge has a curvilinear shape.

61. Smoker structure adapted for attachment to an interior wall of a smoker, the interior wall enclosing a cooking space, the smoker structure comprising:

a wall of material defining an enclosure for enclosing a portion of the cooking space, the enclosure terminating at first and second ends;

an end wall of material positioned on the wall at one of the first and second ends.

62. The smoker according to claim 61 wherein the wall includes an aperture.

63. A smoker structure adapted for attachment to a cooker, the cooker having an interior wall enclosing a cooking space, the smoker comprising:

a wall of material defining an enclosure for dividing the cooking space into two or more portions, the wall terminating at first and second ends.

64. The smoker according to claim 63, wherein the first end of the enclosure is adapted to support a container.

65. The smoker according to claim 61, wherein the end wall of materials covers and encloses the first end of the wall.

66. The smoker according to claim 61, wherein the wall includes at least one aperture.

67. The smoker according to claim 61, wherein the wall is adapted to support a container.

68. The smoker according to claim 65, wherein the wall is adapted to support a container.

69. The smoker according to claim 66, wherein the wall is adapted to support a container.

70. The smoker according to claim 65, wherein the second end of the wall is open.

71. The smoker according to claim 63, wherein the wall includes an aperture.

72. The smoker according to claim 71, further comprising a shaped structure affixed to and extending from the side wall adjacent to the aperture.

73. The smoker structure according to claim 63, wherein the smoker structure further comprises a container affixed to and supported by the first end of the wall.

74. The smoker according to claim 73, wherein the container extends from the first end toward the second end.

75. The smoker structure according to claim 74, wherein an edge of the container is coterminous with the first end of the wall.

76. The smoker structure according to claim 61, wherein the structure further comprises another wall of material supported by and surrounding the wall of material, wherein at least portions of the another wall are spaced apart from an exterior surface of the wall.

77. The smoker structure according to claim 63 wherein the structure further comprises another wall of material supported by and surrounding the wall of material, wherein at least portions of the another wall are spaced apart from an exterior surface of the wall.

78. The smoker structure according to claim 76 wherein the wall and the another wall both include apertures.

79. The smoker structure according to claim 77, wherein the wall and the another wall both include apertures.

* * * * *